United States Patent
Ranganathan et al.

(10) Patent No.: US 9,098,310 B2
(45) Date of Patent: Aug. 4, 2015

(54) CONSTRUCTING AND DEPLOYING PATTERNS OF FLOWS

(75) Inventors: Anand Ranganathan, Fairfield, CT (US); Anton V. Riabov, Westchester, NY (US); Octavian Udrea, Westchester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1444 days.

(21) Appl. No.: 12/608,689

(22) Filed: Oct. 29, 2009

(65) Prior Publication Data

US 2011/0107273 A1 May 5, 2011

(51) Int. Cl.
 *G06F 9/45* (2006.01)
 *G06F 9/44* (2006.01)

(52) U.S. Cl.
 CPC ............ *G06F 9/4436* (2013.01); *G06F 8/10* (2013.01); *G06F 8/447* (2013.01)

(58) Field of Classification Search
 USPC ........................................................ 717/155
 See application file for complete search history.

(56) References Cited

U.S. PATENT DOCUMENTS

| | | | | |
|---|---|---|---|---|
| 6,851,105 | B1 * | 2/2005 | Coad et al. ..................... | 717/106 |
| 7,873,942 | B2 * | 1/2011 | Shaburov et al. ............. | 717/109 |
| 2005/0166193 | A1 | 7/2005 | Smith et al. | |
| 2006/0168115 | A1 * | 7/2006 | Loupia et al. ................. | 709/218 |
| 2006/0248467 | A1 | 11/2006 | Elvanoglu et al. | |
| 2007/0033590 | A1 | 2/2007 | Masuouka et al. | |
| 2007/0169052 | A1 * | 7/2007 | Vanrenen et al. ............. | 717/154 |
| 2007/0214111 | A1 | 9/2007 | Jin et al. | |
| 2007/0214171 | A1 | 9/2007 | Behnen et al. | |
| 2007/0214176 | A1 | 9/2007 | Rao et al. | |
| 2007/0244876 | A1 | 10/2007 | Jin et al. | |
| 2008/0127046 | A1 * | 5/2008 | Mitchell et al. ............... | 717/104 |
| 2008/0228851 | A1 | 9/2008 | Angelov et al. | |
| 2008/0229278 | A1 | 9/2008 | Liu et al. | |
| 2009/0019380 | A1 * | 1/2009 | Tanaka et al. ................. | 715/763 |
| 2009/0100407 | A1 | 4/2009 | Bouillet et al. | |
| 2009/0125977 | A1 | 5/2009 | Chander et al. | |
| 2009/0150902 | A1 | 6/2009 | Gisolfi | |
| 2009/0171999 | A1 | 7/2009 | McColl et al. | |
| 2009/0177955 | A1 | 7/2009 | Liu et al. | |

OTHER PUBLICATIONS

"SPADE: The System S Declarative Stream Processing Engine," Gedik et al., SIGMOD '08, Jun. 9-12, 2008, pp. 1123-1134.

Eric Bouillet, Mark Feblowitz, Zhen Liu, Anand Ranganathan, and Anton Riabov, "A tag-based approach for the design and composition of information processing applications," in OOPSLA, pp. 585-602, 2008.

\* cited by examiner

*Primary Examiner* — Hang Pan

(74) *Attorney, Agent, or Firm* — Jeff Tang, Esq.; Matthew M. Hulihan, Esq.; Heslin Rothenberg Farley & Mesiti P.C.

(57) ABSTRACT

A flow pattern is generated from a single flow, in which the flow pattern describes a plurality of flows that are structurally similar to one another and perform similar tasks. End users are then capable of exploring the different flows of the pattern and selecting one or more flows based on high-level goals.

25 Claims, 14 Drawing Sheets

FIG. 9B (EXPANDED DESCRIPTION)

FIG. 9C (EXPANDED DESCRIPTION)

CONSTRUCTING AND DEPLOYING PATTERNS OF FLOWS

This invention was made with Government support under Contract No.: H98230-07-C-0383 awarded by Intelligence Agencys. The Government has certain rights in this invention.

BACKGROUND

This invention relates, in general, to facilitating processing within a computing environment, and in particular, to constructing, parameterizing and deploying data processing flows.

Data flows or data mashups, in which data from one or more sources are combined into a single tool or visualization, have become increasingly popular over the past few years. In addition, there are a number of tools that support the building of data-plus-code mashups, in which data is obtained from one or more sources and further processed by one or more components. Examples of such tools are Yahoo Pipes, offered by Yahoo Inc.; Microsoft Popfly, offered by Microsoft® Corporation; and IBM® Mashup Center, offered by International Business Machines Corporation. Yahoo!® is a registered trademark of Yahoo! Inc.; Microsoft® is a registered trademark of Microsoft Corporation; and IBM® is a registered trademark of International Business Machines Corporation, Armonk, N.Y. Other names used herein may be registered trademarks, trademarks or product names of International Business Machines Corporation or other companies.

A data-plus-code mashup, also known as a data processing flow, is described as a graph of data sources and black-box processing components. Data is obtained from one or more static or real-time sources, processed using different components, potentially applying complex mathematical or statistical analytics on them, and the results are stored or visualized in different ways. Data processing flows appear in various component based systems, such as Event-Driven Systems, Stream Processing Systems, Service-oriented Systems, Extract-Transform-Load systems and the Grid, as examples.

BRIEF SUMMARY

In a number of domains (such as financial services, manufacturing, security, etc.), domain experts are reliant on an information technology (IT) development team to support them in different data analysis tasks, including the building of data processing flows. This becomes a problem when the experts need to respond rapidly to a certain situation and there is, for instance, no pre-built mashup flow that meets their current needs. Such applications are often called situational applications, since they need to be built by end-users to address a particular situation, problem, or challenge.

To facilitate end users, in accordance with one or more aspects of the present invention, an approach is provided to simplify the construction, parameterization and deployment of data-plus-code mashups by end-users, such as domain experts. It is observed that in many domains the set of useful flows for end-users often follow certain patterns. Therefore, in this approach, flow developers can specify not just independent flows, but patterns of flows. A flow pattern describes a space of possible flows that are structurally similar and perform similar tasks. The patterns capture the different points of variability in a flow, including 1) the space of possible data sources that can be accessed, 2) the space of possible operations that can be performed on the data, 3) the space of possible sinks or visualizations of the result data, and 4) the space of possible parameters specifiable by the end-user, as examples.

The shortcomings of the prior art are overcome and additional advantages are provided through the provision of a method of providing data processing flows. The method includes, for instance, obtaining, by a processor, an information processing flow; and generalizing, using the processor, the information processing flow to provide a pattern of the information processing flow, wherein the pattern defines a plurality of flows that are derived from the information processing flow, and wherein the generalizing comprises encapsulating one or more fragments of the information processing flow into one or more components, the one or more components usable in creating the plurality of flows.

Systems and computer program products relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 9A-9C show an example of how tags of children components are generated based on inheritance, in accordance with an aspect of the present invention;

DETAILED DESCRIPTION

In accordance with an aspect of the present invention, a capability is provided for creating patterns of data processing flows. A pattern of a data processing flow (a.k.a., a flow pattern) is created from a flow and describes a plurality of flows that are structurally similar to one another and perform similar tasks. The flows of a pattern may have the same or different sources, the same or different outputs, the same or different operations performed thereon, or the same or different parameters associated therewith. End users are capable of exploring the flows described by the pattern and/or selecting one or more of the flows to be used by specifying high-level goals.

Figure 1:
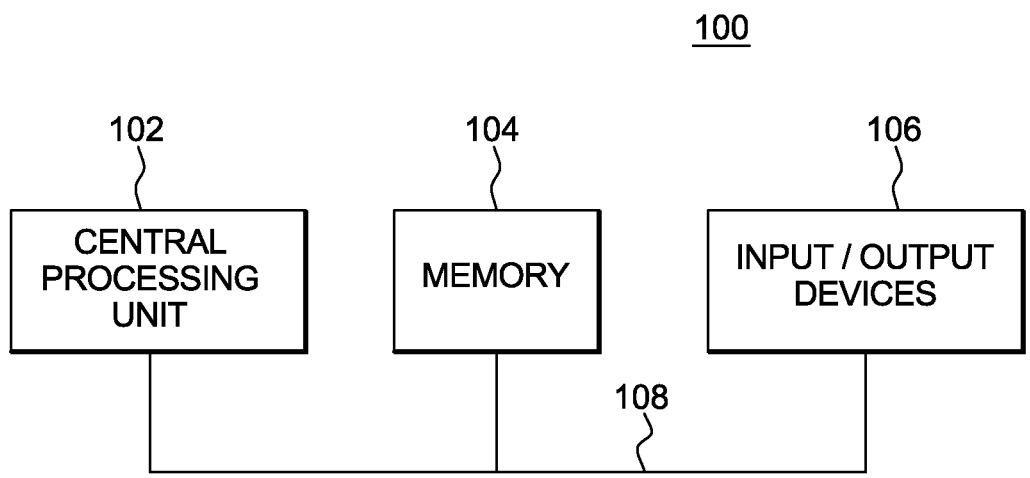
FIG. 1 depicts one example of a computing environment to incorporate and use one or more aspects of the present invention.

One embodiment of a computing environment to incorporate and use one or more aspects of the present invention is described with reference to FIG. 1. Computing environment 100 includes, for instance, one or more processors (e.g., central processing units) 102, a memory 104, and one or more input/output devices 106 coupled to one another via one or more buses 108. In this example, the computing environment is capable of executing a real-time stream processing platform, such as System S or InfoSphere Streams, offered by International Business Machines Corporation, Armonk, N.Y.

Different platforms have their own flow languages, e.g., SPADE for the System S Stream Processing Platform (SPADE is described in "SPADE: The System S Declarative Stream Processing Engine," Gedik et al., SIGMOD '08, Jun. 9-12, 2008, pp. 1123-1134.); BPEL for service-oriented systems; GSFL used for the Grid; Javascript used for web-based applications; and shell or batch scripts for Unix or Windows® Machines. Windows® is a registered trademark of Microsoft Corporation.

To specify patterns of flows, in accordance with an aspect of the present invention, a language is provided, referred to herein as Cascade. Cascade is platform independent, i.e., it can be used to describe flows in any platform. It allows components to be described recursively, where a component is either a primitive component or a composite component. A primitive component can embed code snippets from any platform-specific flow-based language (like SPADE, BPEL, etc.), and a composite component is internally made up of a flow of other components. Cascade provides an inheritance model for components, a number of ways for parameterizing components and the ability to define different structural patterns of flows.

One of the challenges faced by many domain experts is that they are not expert programmers. Thus, in many organizations, they are supported by a team of developers who both develop the basic components and write the flows for them. This lengthens the development life-cycle for flows and makes it more difficult for the experts to respond to new situations. Therefore, in accordance with an aspect of the present invention, a pattern of flows is built that enables end users to easily adapt to new situations. Further details regarding flows and building patterns of flows are described below.

Figure 2:
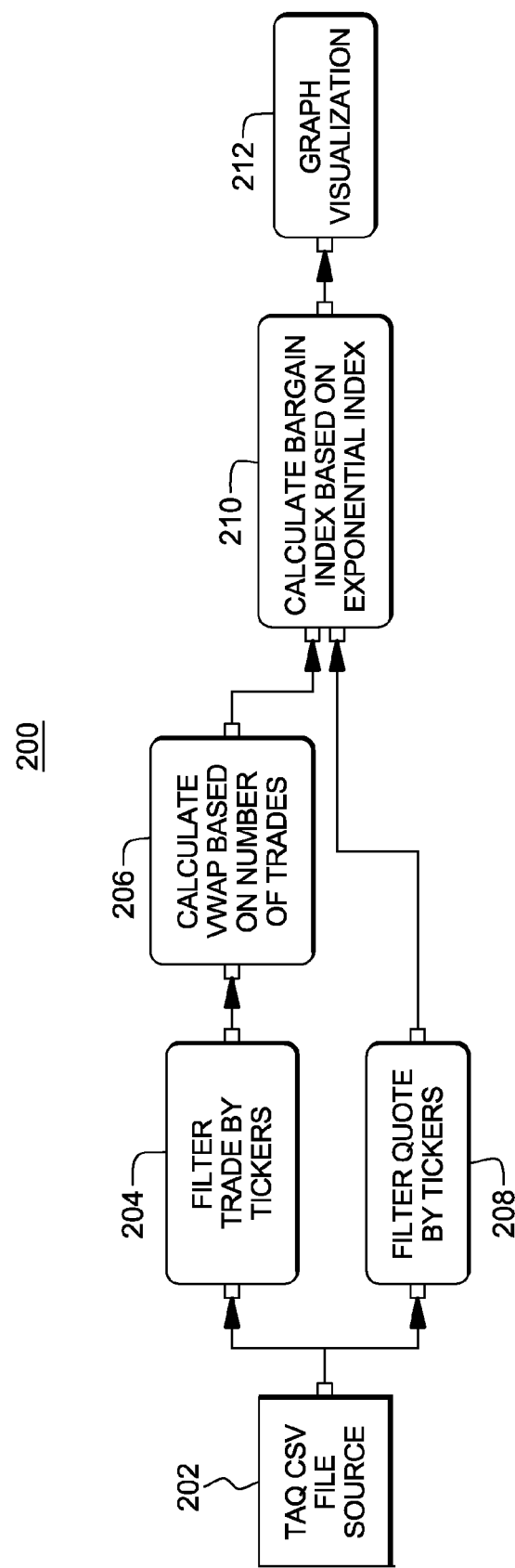
FIG. 2 depicts one example of a data processing flow, in accordance with an aspect of the present invention.

FIG. 2 depicts one example of a flow 200 in the financial services domain. This flow obtains TAQ (Trade and Quote) data 202 from the NYSE (New York Stock Exchange), which describes data on trades and quotes of different stocks. The flow then filters the trades based on a set of tickers 204 and calculates the VWAP (Volume Weighted Asset Price) of the stocks 206. Further, the quotes are filtered by a set of tickers 208, and the result of the filter and VWAP are input to a calculate function 210 to calculate a bargain index of these stocks by comparing the trade data with the quote data. The bargain index, which is a measure of how good a certain quote on a stock is compared to previous trades on the stock, is then visualized on a graph 212.

While the above flow, which may be written in a stream processing language, like SPADE, is useful in its current form, the expert cannot modify the flow, in response to changed circumstances in the financial world. For example, if the expert wanted to apply a different algorithm for calculating the bargain index or apply the analysis on data from a different source, like archived trade and quote data, it is difficult for the expert to do this without help from the developer. Thus, in accordance with an aspect of the present invention, the developer specifies a flow pattern, which describes different degrees of freedom or different possible variations of a flow. The domain expert can then select among the different variations of the flow depending on the current requirements.

Figure 3:
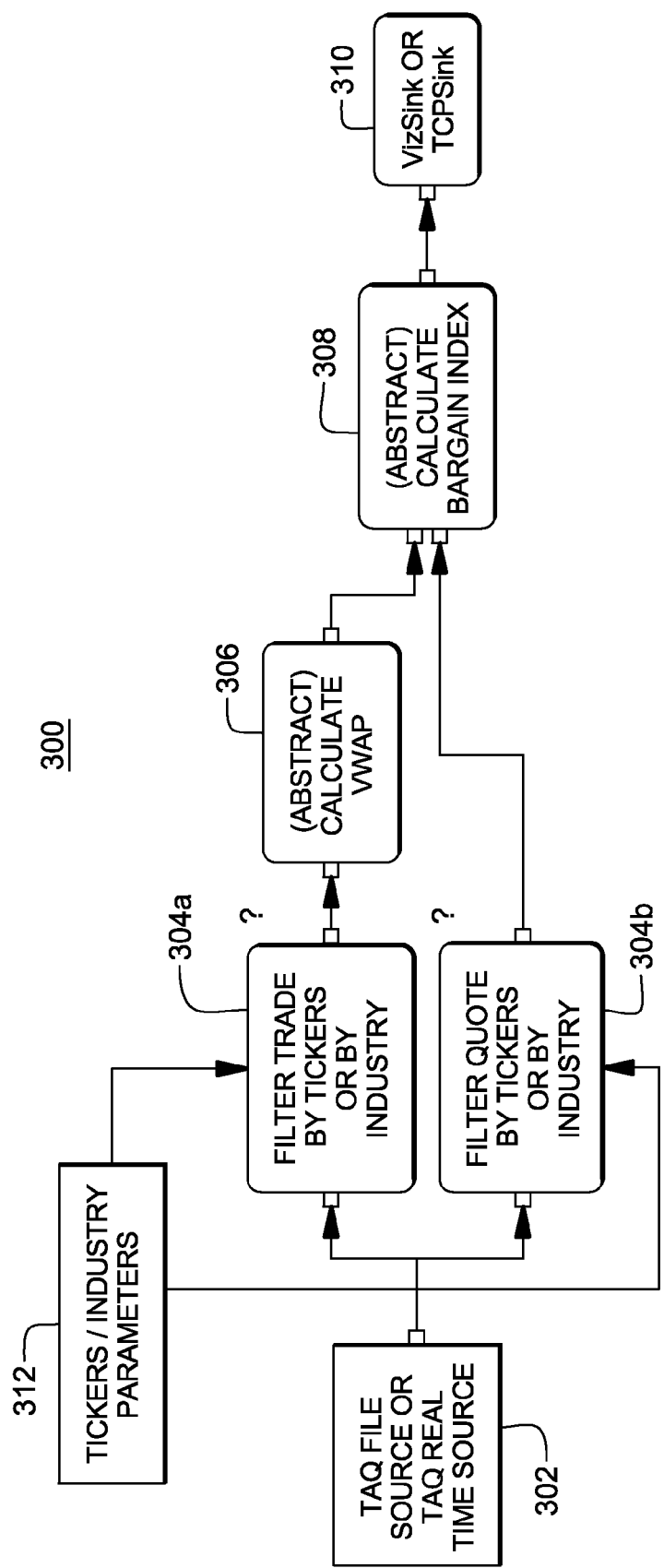
FIG. 3 depicts one example of a flow pattern describing possible variations of the flow of FIG. 2, in accordance with an aspect of the present invention.

One example of a flow pattern that describes possible variations of the flow in FIG. 2 is depicted in FIG. 3. In this pattern definition 300, the data can be obtained from either a TAQ File Source or a TAQ Real-time Source 302, the trades and quotes can be filtered by either a set of tickers or by industry 304a, 304b, and VWAP 306 and Bargain Index 308 calculations can be performed by a variety of components (which inherit from an abstract Calculate VWAP component and from an abstract Calculate Bargain Index component, respectively). The final results can either be visualized in some manner, or can be streamed out on a TCP port 310. The filter components are optional (indicated by the "?" in the figure), and if they do appear, they can be parameterized by a ticker or an industry parameter 312, specifiable by the end-user.

Thus, a single flow pattern may define a large number of actual flows. In this flow pattern, TAQ File Source, TAQ Real Time Source, Calculate VWAP, Calculate Bargain Index, Viz-Sink and TCPSink are all abstract components that have multiple descendant concrete components. Abstract components can be replaced by any of their concrete descendents in the flow. As an example, assume there are 5 different descendants of each of these components. Then, the number of possible flows in this flow pattern (not including different parameterizations of the filter components) is (5+5)×3×3×5× 5×(5+5), or 22500 flows. End-users (e.g., domain experts) can explore the set of flows encapsulated within a flow pattern using a tool referred to as MARIO (Mashup Automation with Runtime Invocation Orchestration), which provides a tag-based, faceted navigation user interface where users can specify their mashup needs (or goals) as a set of tags. MARIO uses an AI (artificial intelligence) planner for composing the flows dynamically given the end-user goals. A flow pattern in Cascade encodes various composition constraints between different components. A pattern compilation approach is provided to generate plannable component descriptions with these component constraints. The planner then uses these component descriptions to generate flows from high-level end-user goals. The composed flow is then translated into a flow-script in a target platform (such as SPADE), using the code snippets embedded within the primitive components.

Figure 4A:
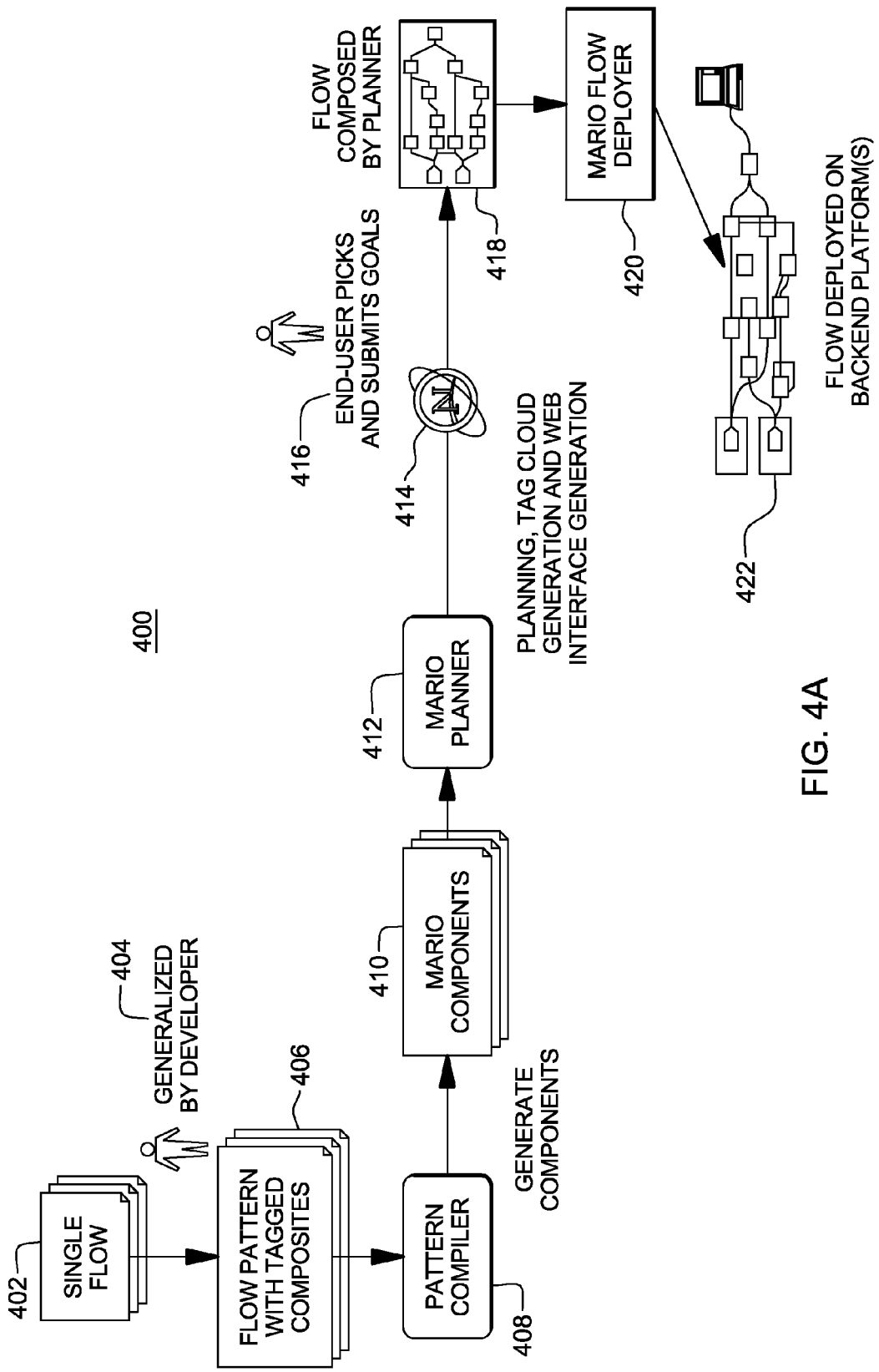
FIG. 4A depicts one embodiment of the logic to develop and use flow patterns, in accordance with an aspect of the present invention.

One example of an overall process of developing and using flow patterns is described with reference to FIG. 4A. Process 400 starts with a single flow 402 that a developer may want to generalize 404 into a flow pattern 406. The generalization process involves identifying different possible variations of the flow, and annotating different components with tags, as described in further detail below. The pattern definition is then compiled by a pattern compiler 408 to produce component descriptions with composition constraints 410 that restrict these components to be composed based on the defined patterns. MARIO planner 412 can then use these component descriptions to generate a web interface 414 where end users can submit goals 416. These goals are then automatically planned into flows 418. The user can then specify flow parameters, and MARIO takes care of deploying 420 the composed and parameterized flows on the available platform 422.

One embodiment of the logic associated with generalizing a single flow into a flow pattern is described with reference to FIG. 4B. In one example, the generalizing logic is performed by a processor. The processor may support a development environment running on a development platform, such as Eclipse, to facilitate performance of the logic.

Figure 4B:
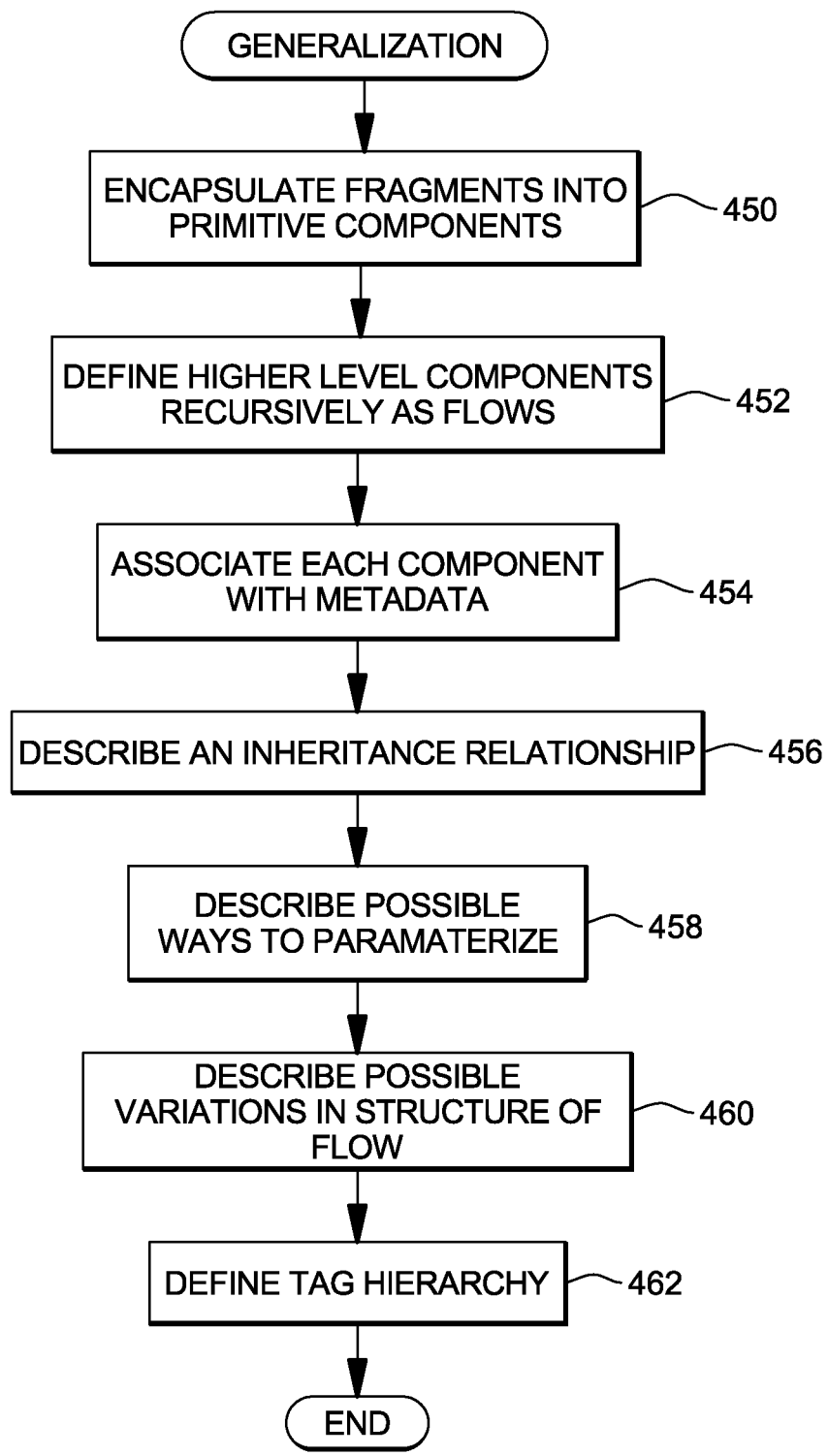
FIG. 4B depicts one embodiment of the logic to generalize a single flow into a flow pattern, in accordance with an aspect of the present invention.

Referring to FIG. 4B, initially, the single flow is received and fragments of the platform-specific language of the flow are encapsulated into primitive components, STEP 450. During encapsulation, code fragments from the single flow (e.g. a single SPADE flow) are imported into the definitions of Cascade primitive components. For instance, in one embodiment, the developer uses an Eclipse-based tool to demarcate fragments of the SPADE code describing the flow and insert them into the body of Cascade primitive component definitions. In other examples, other tools are used (or no tool) to demarcate fragments of the code to provide the components. The demarcation is, for instance, based on user discretion.

Further, higher level components are defined recursively as a flow of primitive components, STEP 452 (see, e.g., below: Component Definition in Flow Pattern, Kinds of Components and Recursive Nature of Components). Additionally, each component is associated with metadata, including, for instance, a name, component type, tags on output ports, etc., STEP 454 (see, e.g., below: Tag Propagation Model in Flows). Moreover, an inheritance relationship is described between components, STEP 456 (see, e.g., below: Inheritance Model for Components). Further, possible ways in which the components can be parameterized are described, STEP 458 (see, e.g., below: Parameterizations of Components).

Possible variations in the structure of the flow are also described, STEP 460. In one example, this includes allowing nodes (or components) in the flow to be replaced by any of their descendants; allowing nodes in the flow to specify an enumeration of possible components that can be in the node; and by allowing components in the flow to be designated as optional.

Additionally, a tag hierarchy is defined (see, e.g., below: Tag Hierarchy).

Each of the above steps is described in further detail below, in addition to further details regarding components, flows and tags.

Components

Figure 5A:
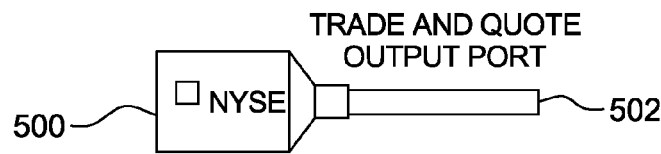
FIG. 5A depicts one example of a component, in accordance with an aspect of the present invention.
Figure 5B:
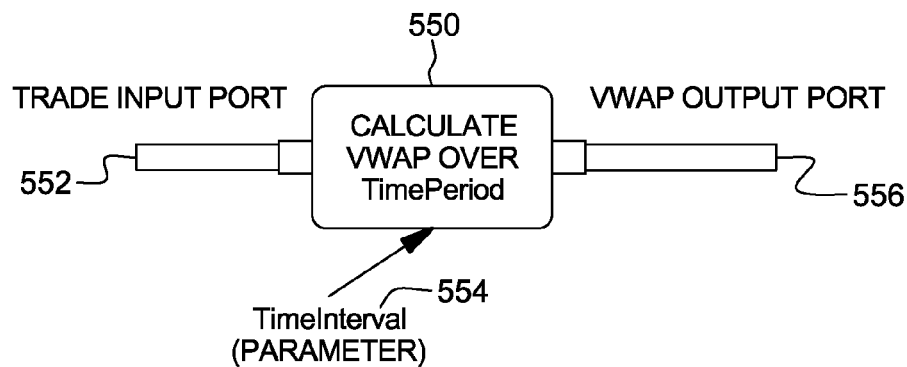
FIG. 5B depicts one example of another component, in accordance with an aspect of the present invention.

Components can have zero or more input ports and zero or more output ports. In addition, components can be instantiated or configured with parameter values that influence the way they behave. A component is treated as a blackbox, where the only information known about the component are its inputs, outputs and parameters. FIGS. 5A-5B show two example components. FIG. 5A depicts an example of a NYSE component 500 having zero input ports and an output port 502. FIG. 5B depicts a Calculate VWAP over TimePeriod component 550, which calculates a volume weighted average price of a stock, where the averaging is performed over a configurable timeperiod. It has one input port 552, where it obtains trade data; one configuration parameter 554, the time period for doing the average; and one output port 556, which is the VWAP (volume weighted asset price).

Formally, a component, x, can be defined as a triple ($\{I^i_x\}$), $\{P^j_x\}$, $\{O^k_x\}$ where 1. $\{I^i_x\}$, i=1 ... m is a set of m input ports
2. $\{O^j_x\}$, i=1 ... n is a set of n output ports
3. $\{P^k_x\}$, i=1 ... p is a set of p parameters Flows A flow is a directed acyclic graph of components, where the vertices are components and the edges are data links between the components' input and output ports. In a flow, the input ports of components have a data link connected to them and the directed edges (data links from source output ports to target input ports) are valid, i.e., the data produced at the source output port is semantically and syntactically compatible with the data required at the target input port.

A fairly general notion of data links is provided. In different platforms, the data links may be implemented in different manners. For example, in web-based mashup systems, like Yahoo Pipes, the links are RSS feeds. In stream processing and event-driven systems, the data links are data or event streams. In extract-transform-load systems, the links are tables. In service-based systems, the links may be messages in a binary or XML format.

Formally, a flow is a directed acyclic graph, $\mathcal{G}$ ($\mathcal{V}$, E). Each vertex $v \in \mathcal{V}$ represents the invocation (or instantiation) of a component. Each edge is of the form $e(u^j_o, v^k_i)$ and represents a data link from the j'th output port of u to the k'th input port of v. The edges are directed.

In general, flows can contain unbound input ports. However, in order for a flow to be deployable, in this example, each input port of a component has at least one incoming data link, i.e., $\forall v \in V, \forall I^k_v, \exists u^j_o, e(u^j_o, v^k_i) \in E$ where $I^k_v$ is an input port of v.

Tag Hierarchy

The set of tags used in the system belong to a tag hierarchy. Let T=$\{t_1, t_2, \ldots, t_k\}$ be the set of tags in the system. A tag hierarchy, H, is defined as a directed acyclic graph (DAG), where the verticies are the tags, and the edges represent "sub-tag" relationships. The notion of sub-tags is useful in inferring additional tags for objects. A tag $t_1 \in T$ is a sub-tag of $t_2 \in T$, denoted by $t_1 < t_2$, if all objects annotated by $t_1$ can also be annotated by $t_2$. For example, define IBM<Company, which implies that any object tagged with IBM can also be tagged with company. The sub-tag relation is transitive, i.e., if $t_1 < t_2$ and $t_2 < t_3$ implies $t_1 < t_3$ for $\forall t_1, t_2, t_3 \in T$. For notational convenience, assume that each tag is a sub-tag of itself, i.e., $\forall t \in T, t<t$.

Figure 6:
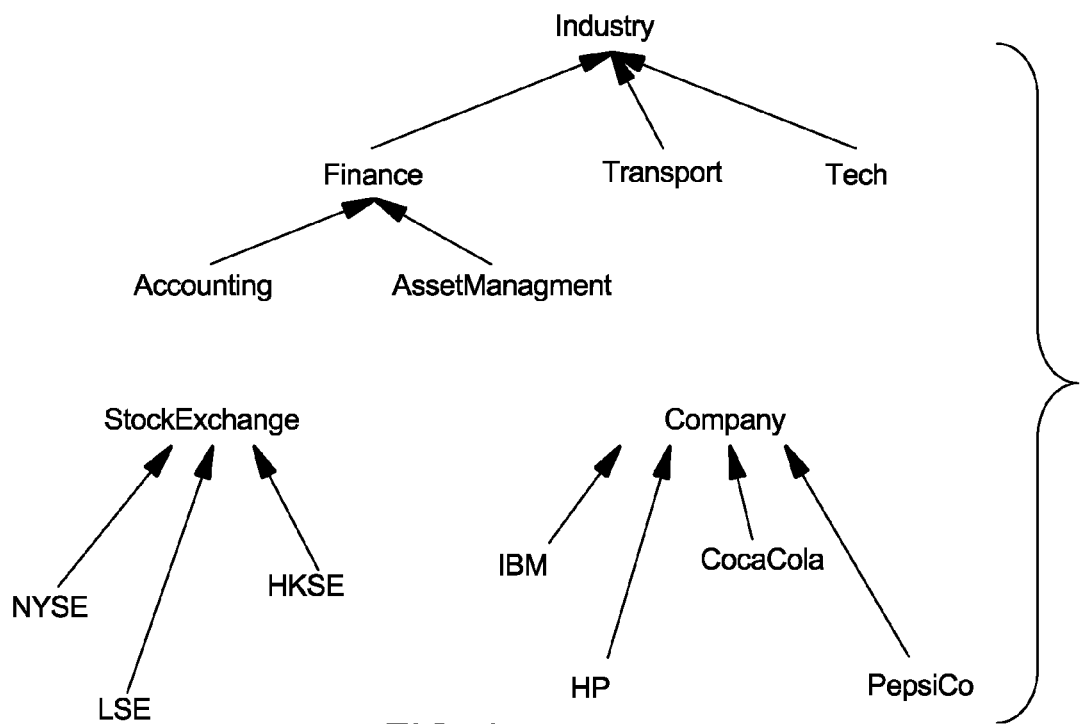
FIG. 6 depicts an example of a tag hierarchy, in accordance with an aspect of the present invention.

One example of a tag hierarchy showing example sub-tag relationships is depicted in FIG. 6. The tag hierarchy is domain specific. Different domains may have different sets of tags and different tag hierarchies. Also, the <relationship may correspond to different semantic relations like sub-class, instance-of etc.

Tagging of Data Links

Tags are used to describe the data links in a flow. The tags describe the semantics of the messages that flow in the link, as well as the actual syntax (using tags that correspond to names of types such as XML schema names or Java interface names).

Figure 7A:
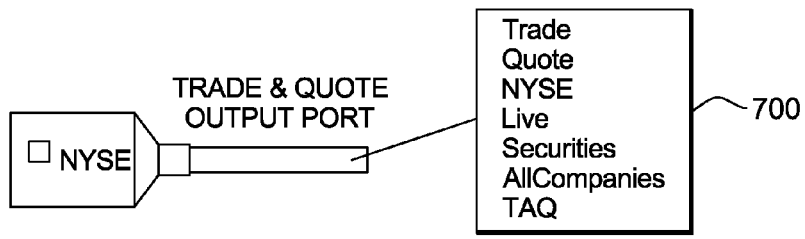
FIGS. 7A-7D depict various examples of tags, in accordance with an aspect of the present invention.
Figure 7B:
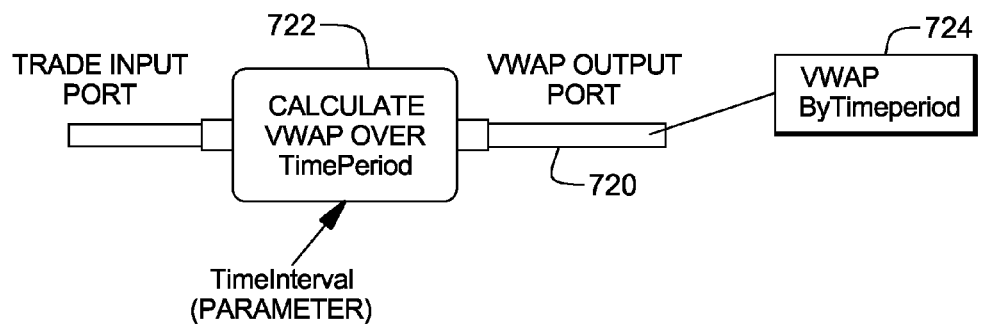

Each data link a is characterized by a set of tags $d(a) \subseteq T$. For example, consider the New York Stock Exchange (NYSE) market data feed, which includes trade and quote prices of different companies in a "TAQ" format. This feed may be described by the tags {Trade, Quote, NYSE, Live, Securities, AllCompanies, TAQ} 700, as shown in FIG. 7A.

Querying for Data Links

End-users interact with MARIO by submitting queries for data links. The query is in the form of a set of tags. Let R={r} be the set of data links A query, $q \subseteq T$, selects a subset R.q of the data link set R such that each data link in the selected subset has all the tags in q or subtags thereof Formally, R.q={$r \in R | \forall t \in q \: \exists t^1 \in d(r)$ such that $t^1 < t$}.

For example, the query {Trade, StockExchange} will match the data link produced by NYSE data source, making use of the sub-tag relationship NYSE<StockExchange.

The explicit matches of a query are the data links that satisfy the query requirements. Implicitly, however, the results of a query are not just the satisfying data links but the flows that produce the desired links. Hence, the planner treats an end-user query as a goal for constructing flows that produce the desired links. The planner treats an end-user query as a goal for constructing flows that produce satisfying data links. Query (or goal) satisfaction, thus, can be viewed as a search in the space of all possible flows that can be constructed from a given set of components.

Note that while the goal, by one definition, selects all matching data links (and flows), an end-user does not have to be presented with all matching resources, because there may be too many. Also, any technique that searches for satisfying flows need not actually come up with all possible flows because there may be too many of them, and it may be inefficient to search for all of them. It may instead try to come up with a ranked list of top flows based on some ranking function.

Patterns

Flow patterns allow developers to generalize existing flows so as to capture the possible variations the flow can take and the possible parameterizations of the flow. There are, for instance, five elements in the description of flow patterns:

1. Tagging model for components;
2. Inheritance model for components;
3. Recursive, hierarchical nature of components;
4. Parameterizations of components; and
5. Structural patterns of flows.

Each of these elements is described below.

Tagging Model of Components

Developers can annotate components with tags from the tag hierarchy. More specifically, they can annotate the output ports of components with tags to describe the semantic and syntactic properties of the data produced by these output ports. FIGS. 7A-7D show some examples of component descriptions. For example, the output 720 (FIG. 7B) of the VWAP component 722 is associated with two tags 724: VWAP, ByTimePeriod.

Figure 7C:
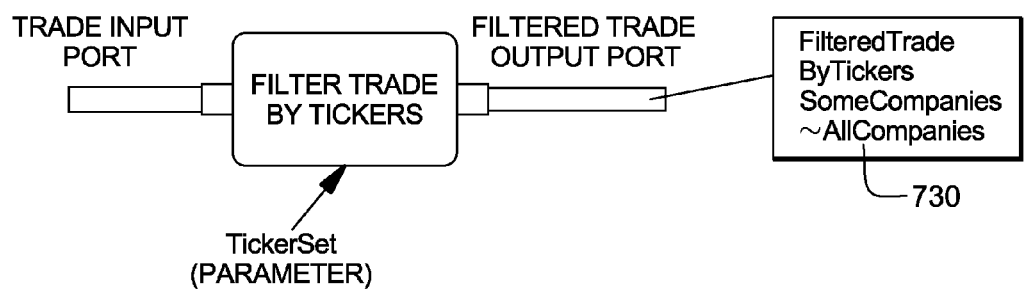
Figure 7D:
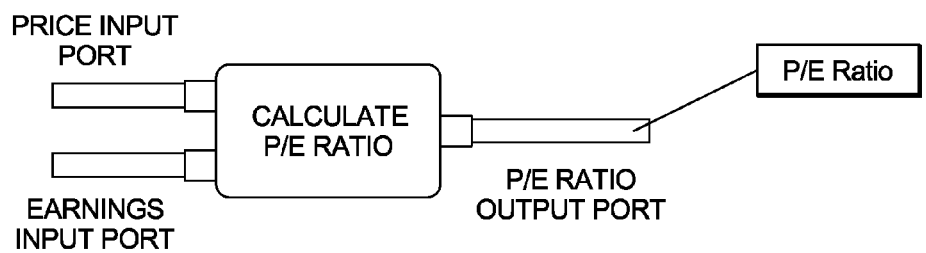

In addition, output ports can also be annotated with "negated" tags, which are represented with a preceding tilde ("~"). This means that the data produced by this output port will not be annotated by this tag. This feature is particularly useful in the case of components that perform operations that result in certain semantic properties of the input not appearing on the output. Examples of such components are filters, anonymizers or aggregators that can mask or remove some of the properties of the incoming data. One example of a negated tag is depicted in FIG. 7C at 730.

Formally, a component x, can have zero or more named output ports, with the names $\{O^i_x\}$, i=1, ... n. Each output port is associated with a description, $d\{O^i_x\}$. Let T be the set of all available tags, as defined in the tag hierarchy. Let ~T represent the set containing the negations of these tags. Then, each output port of a component is associated with a description, $d(O^i_x) \subseteq (T \cup \text{~}T)$.

Tag Propagation Model in Flows

Figure 8:
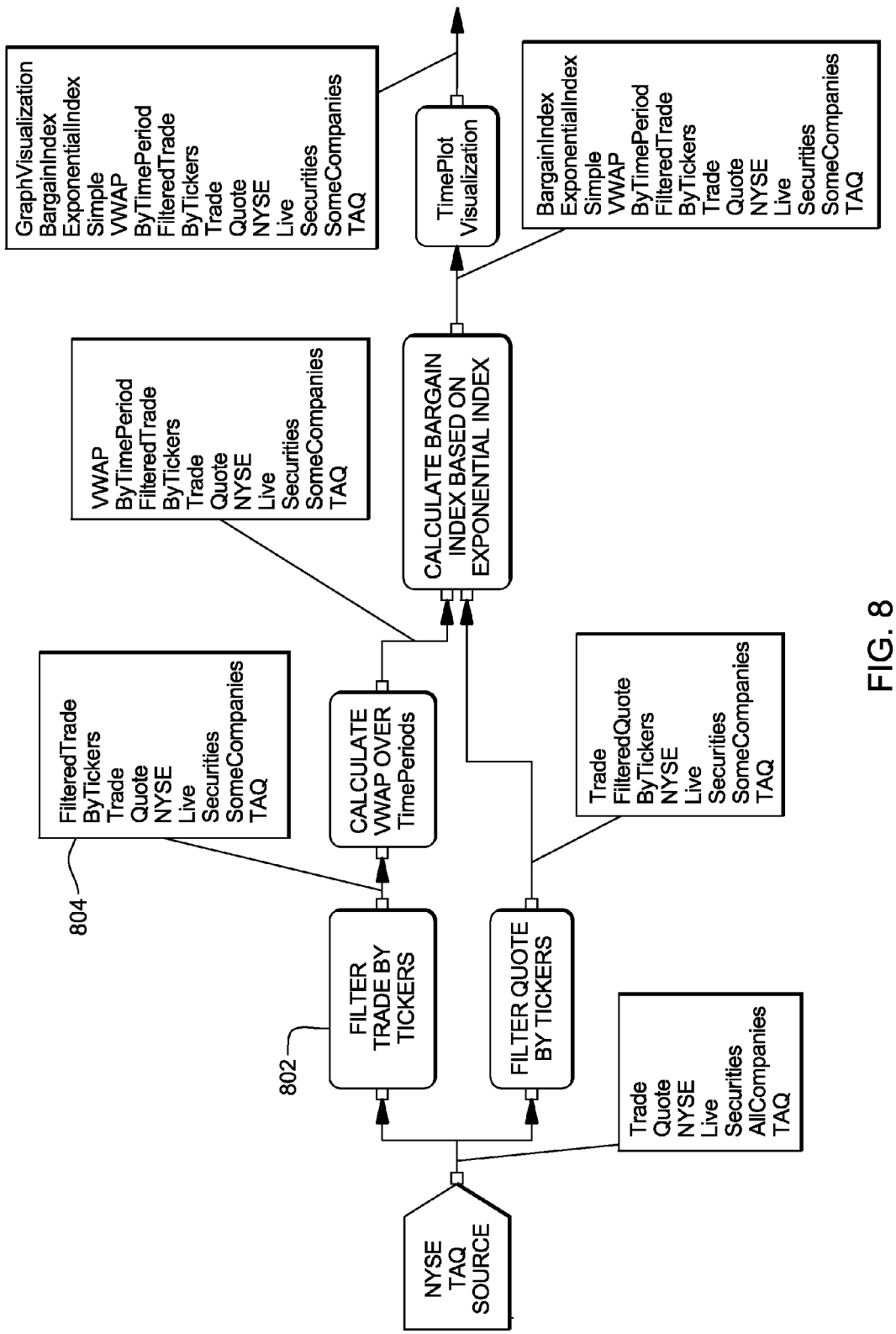
FIG. 8 depicts one example of a flow showing tags that annotate different output data links of components, in accordance with an aspect of the present invention.

The tags used to annotate output ports can be described as "sticky tags". This is because if any output port is annotated by a tag, then the downstream data links in a flow are also annotated by this tag, unless another component explicitly removes this tag. FIG. 8 depicts an example of a flow showing the tags that annotate different output data links of components. The figure shows how each component adds or removes tags on its output data link. For example, consider the Filter Trade By Tickers component 802. It adds three tags 804 (compared to the tags of FIG. 7a): FilteredTrade, ByTickers, and SomeCompanies, and removes one tag, AllCompanies, to the tags it receives on its input link.

The tags on any data link in a flow depend on the components that appear before (or "upstream") of the data link in the flow. More specifically, it depends on "upstream" output ports of these components.

Consider a component, x, with n input ports. Let $d_i(a)$, i=1 ... n, be the n input data links to the component, x, in a flow. Then, the description of the output data link, b, corresponding to the output port, $O^j_x$ of x, can be described by the set of tags, d(b), where $d(b) = (\cup_{i=1}^{n} d_i(a)) \cup (O^j_x \cap T) - (O^j_x \cap \text{~}T)$.

This means that the output data link can be described by the tags that appear in the input data links to the component and the tags that appear in the output port annotation of the component, and after removing the negated tags that appear in the output port annotation.

Component Definition in the Flow Pattern

In Cascade, a component can be invoked to transform input data links to output data links. Cascade supports two kinds of components: primitive and composite. A composite component contains a reusable sub-graph, representing a sub-flow-pattern. Therefore, a flow pattern definition can be viewed as a hierarchy of component invocations, where the leaves are primitive components, each level groups graphs of components into composites, and the root is a main composite, which can be deployed on a backend platform.

Each component definition has a head and a body. The head lists input ports, output ports and parameters of the component, and any metadata. The body can be one of the following, as examples:

1. The body can be empty in the case of an abstract component.
2. In the case of a primitive component, the body can embed code or scripts in any platform-specific flow-based language.
3. In the case of a composite component, the body can contain a graph definition, where the graph defines the internal flow pattern within the composite.

The head of a component definition includes, for instance, the operator name and lists its ports and parameters. The metadata is enclosed within /#* and #/. For example, a component definition is as follows:

```
/#*
    @type         "spade"
    @title        "Sample"
    @tags K       tag1 tag2
    @tags L       tag3
*#/
```

```
component M (output K, L; input G, H) {
                                param $P, $Q;
    <component body>
}
```

The component M has two output ports, K and L, and two input ports, G and H. It has two parameters $P, $Q. The metadata indicates the type of the component (enclosed within quotes), the title (a short natural language sentence enclosed within quotes), and tags on each of the output ports. For example, the tags on port K are tag1 and tag2, and the tag on port L is tag3.

Kinds of Components

There are 3 different kinds of component bodies, as examples:

1. Abstract component: An abstract component has no body defined. For these components, there is a keyword abstract in the component head.
2. Composite component: This refers to a component which is internally made up of a flow of other components. The component body describes the flow graph.
3. Primitive component: The component body can embed fragments of code from any other flow-based language (like SPADE, BPEL, etc.). This code is embedded within a "/$" and "$/". Parameters within the code are enclosed within @'s. Also, any names of input or output links are enclosed within @'s. The reason for encoding the names of parameters and input and output ports is so that these names can be replaced by parameter strings or newly generated input and output data link names in a composed flow. Therefore, the Cascade compiler does not need to know about the grammar of the embedded code; it only needs to know certain key strings in the embedded code, such as any references to input and output ports, and parameters.

The code snippet below shows an example of a primitive component that embeds code in the SPADE language, which is used for describing flows in the System S stream processing platform. These SPADE code snippets are used in translating a composed flow containing these components into a SPADE script that can be deployed in System S.

```
/#*
@type      "spade"
@title     "Filter Trade By Industry"
@tags      TradeFilter    Trade FilteredTrade ByIndustry
                          -AllCompanies SomeCompanies
*#/
component    FilterTradeByIndustry
        (output TradeFilter; input TradeQuote) {
                param string $industry;
//embedding SPADE code snippet
/$
    stream @TradeFilter@ (schemaof(@TradeQuote@))
        := Functor(@TradeQuote@)
            [industry="@industry@" & ttype="trade"]
            { }
$/
}
```

Inheritance Model for Components

The flow pattern model supports a single inheritance model, where a component can inherit from another component. The inherited component has the same signature as the parent component (i.e., the same number and formats of inputs, outputs and parameters).

A component can also be declared as abstract, i.e., it only defines a header and no body. The header includes the input, output and parameter specification, as well as the metadata, such as tag-based annotation of inputs and outputs. Descendants of the component can define the body (which includes platform-specific deployment instructions).

In one example, the rules of inheritance are:
1. The inherited component has the same signature as the parent component (i.e., the same number and formats of inputs, outputs and parameters).
2. If the inherited component defines a body, then this body overrides the parent component's body (if defined).
3. The inherited component can define tags on the inputs and output ports. These tags may be normal tags or negated tags. The net (or expanded) description of an inherited component is obtained by computing the union of the tags defined by the child and the tags defined by the expanded parent.

Figure 9A:
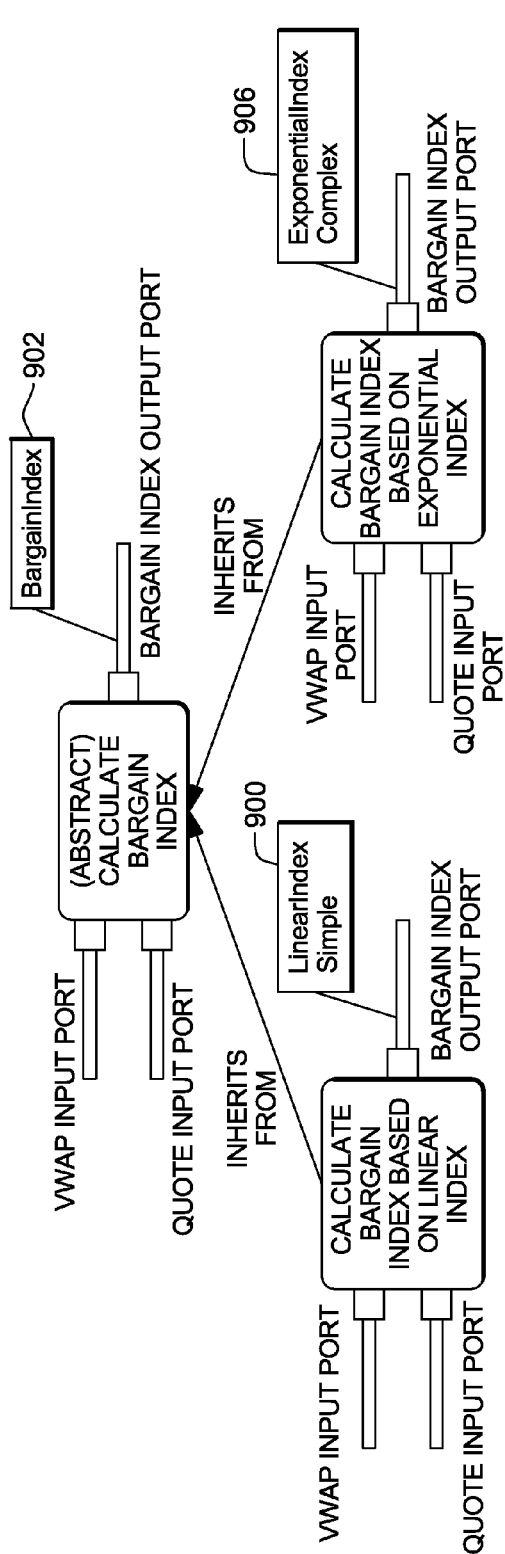
Figure 9A:
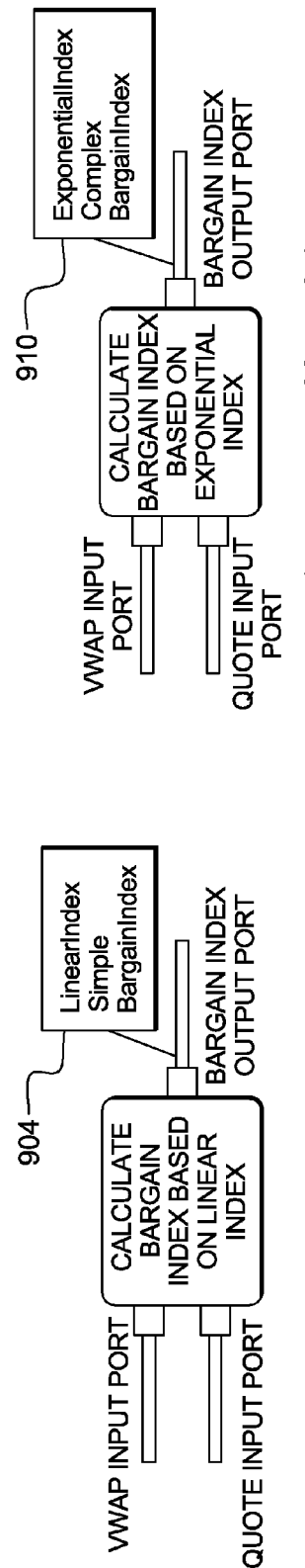

FIGS. 9A-9C show examples of how the tags of children components are generated based on inheritance. For instance, a union of tags 900 and 902 of FIG. 9A produce tag 904 of FIG. 9B; and a union of tags 906 and 902 of FIG. 9A produce a tag 910 of FIG. 9C.

The following code fragment shows the definition of the abstract BIComp component and its sub-components, BiComp_Simple and BIComp_Complex. The defined components are primitive components, and the concrete sub-components embed snippets of code in SPADE.

```
/#*
@type      "spade"
@title     "Bi Computation"
@tags      BargainIndex        BargainIndex
*#/
abstract component BIComp
            (input Vwap, QuoteFilter; output BargainIndex) {
}
/#*
@type      "spade"
@title     "Computer Simple Bargain Index"
@tags      BargainIndex        Simple    LinearIndex
*#/
component BIComp_Simple
        (input Vwap, QuoteFilter; output BargainIndex) : BIComp{
//Embedding SPADE code snippet
/$
strream @BargainIndex@ (bargainindex : Float)
        := Join( @Vwap@ <count(1)>;
                @QuoteFilter@ <count(0)>) [true]
                { select(cvwap > askprice*100.0,
                (cvwap-askprice)/askprice, 0.0)
$/
}
/#*
@type      "spade"
@title     "Compute Complex Bargain Index"
@tags      Bargain Index       Complex Exponential Index
*#/
component BIComp_Complex
        (input Vwap, QuoteFilter; output BargainIndex) : BIComp{
//Embedding SPADE code snippet
/$
stream @BargainIndex@ (bargainindex : Float)
        := Join (@vwap@ <count(1)>;
                @QuoteFIlter@ <count(0)> ) [true]
                { select(cvwap > askprice*100.0,
                    exp(cvwap-askprice*100.0)*asksize, 0.0 }
$/
}
```

A formal reasoning process is defined where the description of components are expanded based on the descriptions of their parents. Consider a component, c, described by the pair ($\{I_c\}$, $\{P_c\}$, $\{O_c\}$), where $\{I_c\}$, $\{P_c\}$ and $\{O_c\}$ are sets of names of input ports, parameters and output ports, respectively. As defined earlier, ($\{d'(O_c)\}$) are the descriptions of the output ports. Let ($\{d'(O_c)\}$) be the expanded descriptions of the component, which is obtained recursively as follows:
1. If c has no parent, then ($\{d'(O_c)\}$)=($\{d(O_c)\}$)
2. Else, let p be the parent component, with input and output ports ($\{Ip\}$, $\{P_p\}$, $\{O_p\}$). Then, for each output port, $d'(O_c)=d(O_c) \cup d(O_p)$. In case of any conflicts in tags and their negations between the child and its parent the child wins.

Recursive Nature of Components

A recursive component, x, is defined as being one of the following:
  A primitive component, which cannot be broken down further into smaller components;
  A composite component, which, internally contains a reusable flow-graph, where other components can be invoked with input data links to produce output data links Both primitive and composite components have an external interface that can be described as sets of input and output ports, and parameters.

Figure 10:
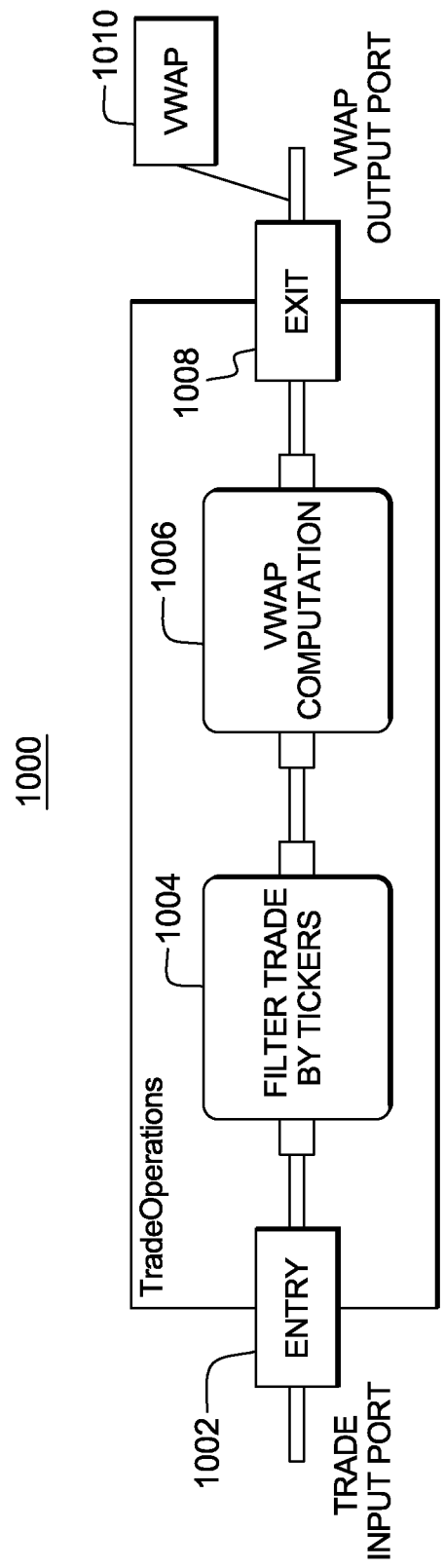
FIG. 10 depicts one example of a composite component, in accordance with an aspect of the present invention.

A composite can be modeled as a graph of components, with two additional "virtual" components: an entry component and an exit component. The entry component has one input port and one output port corresponding to each input port of the composite. The exit component has one input port and one output port corresponding to each output port of the composite. Each "virtual" entry component input port receives data on any connected data link and forwards it on the corresponding output port to each internal component that takes input to this data link. Each "virtual" exit component input port is connected to the output port of an internal component that produces output data, and the component forwards it out to any components in the flow connected to the output port of the composite. FIG. 10 shows an example of a composite component 1000, which includes an entry component 1002, a filter trade by tickers component 1004, a VWAP computation component 1006, an exit component 1008 and a VWAP tag 1010.

A composite is declared with a graph clause in the component body. The graph clause of a composite operator describes a data flow subgraph, which can then be expanded in different contexts when the operator is invoked. An example is, as follows:

```
component M (output K, L; input G, H) {
graph
    stream I = O(G) {param a: 10; }
    stream J = P(H) { }
    stream K = Q(I; J) { }
    stream L = R(J) { }
}
```

The above example describes a flow graph for composite M. This flow graph includes invocations of other components O, P, Q, R. The term 'stream" is used to refer to data links in general. The format of the invocation is stream<output data links>=<component-name>(<input data links>) param<parameter values>.

The input output streams are separated by ",", if there are more than one of them. If there are more than one output streams, they are enclosed within "("and")". Parameter values are of the form <parametername>:<parametervalue>.

Assume that the composite M is invoked twice inside the graph clause of another composite:

```
(stream C; stream D) = M(A; B) { }
(stream E; stream F) = M(A; B) { }
```

Figure 11A:
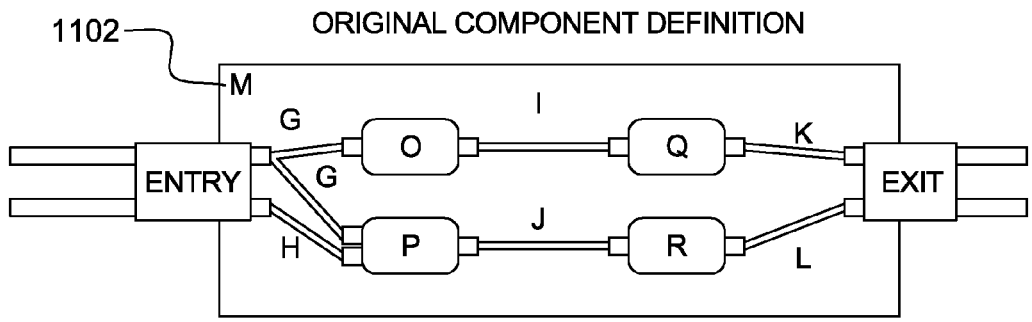
FIGS. 11A-11B illustrate various graph topologies, in accordance with an aspect of the present invention.
Figure 11B:
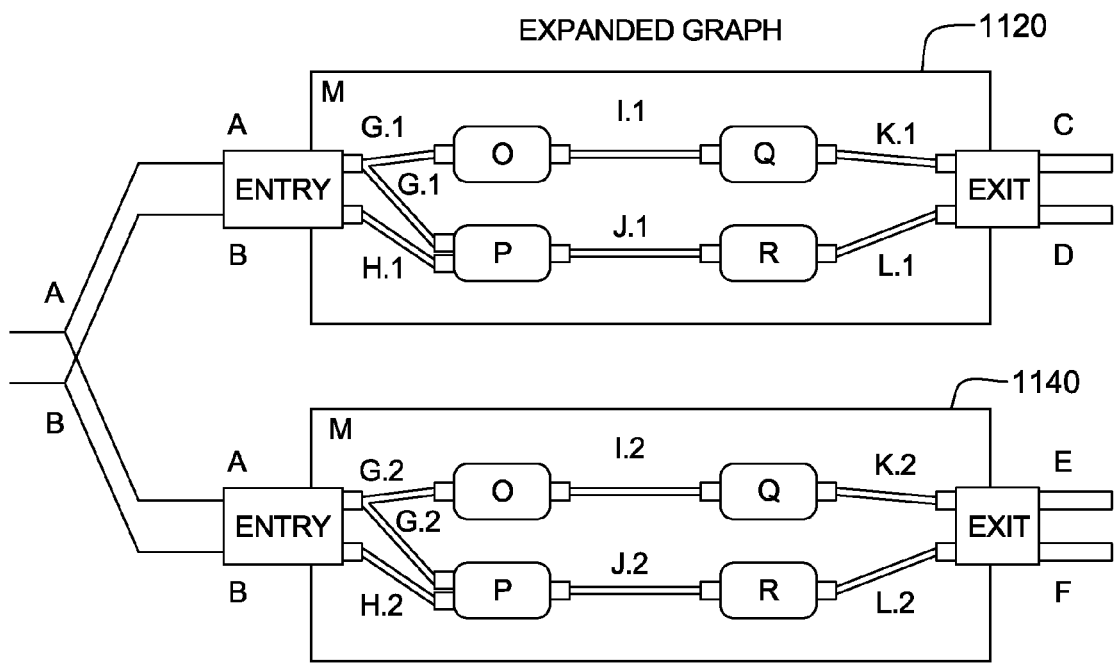

FIGS. 11A-11B illustrate the graph topology in this example. The original graph 1100 (FIG. 11A) includes two invocations using composite operator M (1102): once, as shown in the expanded graph at 1120 (FIG. 11B) to transform A and B into C and D; and the other to transform A and B into E and F, as shown in the expanded graph at 1140. The head of the composite operator definition (output K, L; input G, H) defines input and output ports. When the composite operator gets used, actual input and output streams are bound to these ports; for example, for the first invocation, the bindings are G=A, H=B, K=C, and L=D. These bindings can be viewed as being implemented by "virtual" entry and exit components. Note that the entry and exit components do not correspond to actual components on the underlying platform; they merely help in modeling composites. In the expanded graph (FIG. 11B), intermediate streams such as I and J in the example are duplicated and renamed.

Formally, a composite, x, with m input ports and n output ports, can be modeled as a flow, $G(V,E)$, with the set of vertices, $V \subseteq C \cup \{x^{entry}\} \cup \{x^{exit}\}$. That is, the set of vertices can include other primitive or composite components, C, as well as two sets of special components, $x^{entry}$ and $x^{exit}$, which represent the entry and exit components respectively. The set of edges is $E \subseteq V \times V$.

Parameterizations of Components

Apart from input and output ports, the external interface of a component (primitive or composite) can also have parameters. In any invocation of a component within a composite, the values of the parameters to the component are supplied. There are, for instance, three different ways in which the values of the parameters can be supplied:

1. Composite hard-coded value: The value of a parameter of a component may be hard-coded within the invoking composite. As an example, in the following piece of code, the VwapComputation component is invoked within the input data link TradeFiltered and its parameter called window is passed the value 4:

```
stream Vwap = VwapComputation(TradeFiltered)
    {parm window: 4;}
```

2. User Specified value: The invoking composite can indicate that the value of a parameter is to be obtained from the end-user. This means that the end-user can supply the parameter value using some user-interface widget like a text box or a combo box, etc. The invoking composite can specify a default value for this parameter. As an example, in the following piece of code, the FilterTradeByTickers component is invoked with the input data link IndustryFiltered and its parameter called monitoredTickers is passed a user specified value. This user specified value is obtained from a text box on the user interface, with the prompt, Company Set and the default value that appears in the text box is IBM,MSFT:

```
stream TradeFiltered =
        FilterTradeByTickers(IndustryFiltered)
    {parm monitoredTickers:
        UserParam("Company Set", "IBM,MSFT"); }
```

3. Tagged value: The parameter value may be associated with one or more tags. This is particularly useful if the parameter can take one of a small number of possible values. Then, the end-user can pick among these values, via tags that are part of the goal. As an example, in the following piece of code, the FilterTradeByIndustry component is invoked with the input data link TradeQuote and its parameter called industry is passed one of the following values: Tech, Finance or Transport. In addition, tags named Tech, Finance and Transport are presented in the MARIO goal tag cloud; so, the user can pick these tags and add it to his goal. This will likely result in a plan (flow) where the name of the tag he picked would be fed as a parameter value to the component.

```
stream IndustryFiltered =
        FilterTradeByIndustry(TradeQuote)
    {param industry:
        ConstParam("Tech", "Finance", "Transport");}
```

Parameters to composites can in turn be fed as parameters to a contained component. The code fragment below shows this:

```
/#*
@type    "spade"
@title   "Compute VWAP"
@tags    Vwap VWAP
*#/
composite CallVWAP(input TradeQuote; output Vwap) {
param $windowSize;
graph
        stream Vwap = VwapComputation(TradeQuote)
            {param window: $windowSize;}
```

Structural Patterns of Flows

Flow patterns allow the capturing of variations in the structure (or topology) of flows. Each flow pattern can encapsulate a (possibly large) number of actual flows. Flow patterns are captured within a composite. There are four kinds of structural patterns that can be defined, as examples:

1. Enumerations: In a flow, each vertex represents the invocation of a component (with certain input data links and parameter values) to produce output data links. In a flow pattern, each vertex can specify an enumeration of possible component invocations. A constraint is that the possible component invocations are to produce the same number and format of output data links Enumerations are specified by listing the different possible component invocations and separating them by "|". As an example, in the code fragment below, the TradeQuote data link is produced by either invoking the TAQFile-Source component with a fileNameParam obtained from the end user or by invoking the TAQRealTimeSource component with the ipaddress parameter obtained from the end user.

```
stream TradeQuote = TAQFileSource( )
    {param fileNameParam:
```

-continued

```
        UserParam("TAQ Filename","");}
    | TAQRealTimeSource( )
        {param ipaddress:
            UserParam("TAQ IP Address", "192.168.1.1");}
```

2. Optional components: In a flow pattern, a vertex can be specified as optional. This means that it may or may not appear in an actual flow. If the vertex does not appear in the flow, then it is as if each incoming edge to the vertex is merged with an outgoing edge. (The edges are ordered). A constraint is that each of the possible components invoked in the vertex is to have the same number and format of input ports and output ports.

A filter component is a good example of this. For instance, FilterTradeByTickers is a component that receives trade data and only outputs trade data for tickers that belong to a user-defined set (e.g., IBM, MSFT). Note that for this component, the input and output data have the same format, and the component has only one input and one output compatibility between its predecessors and successors in the flow.

Optionals are specified by adding a "?" to the set of output data links produced by the optional component. As an example, in the code fragment below, the TradeFilter data link may be produced by either invoking the FilterTradeByTickers component with the input data link, TradeQuote, or by not invoking the component at all, which means that the TradeFilter data link is the same as the TradeQuote data link.

```
stream TradeFilter? = FilterTradeByTickers(TradeQuote)
    {param monitoredTickers: "IBM, MSFT";}
```

3. Use of high-level components: In a flow pattern, a component invoked in a vertex can be replaced by any of its descendants. This allows the use of high-level or abstract components in the flow pattern definition.

For example, the code fragment below, shows the BargainIndex stream produced by invoking the BIComp component with two input streams to its two input ports. BIComp is declared as an abstract component and has two concrete children. So, in effect, this means that the BargainIndex stream may be produced by either invoking the BIComp_Simple component or the BIComp-Complex component.

stream BargainIndex—BICompC(Vwap; QuoteFilter)

A Cascade program includes a set of component definitions, possibly spread across multiple files. The set of files (or directories) to find component definitions is specifiable in a configuration file. A main component is used to define the top-level component. The following code fragment shows an example Cascade program, defining three composites, that successively invoke one another.

```
/#*
@type    "spade"
@title   "main"
*#/
component main{
graph
        stream s = StockBargainIndexComputation ( )
            {param monitoredTickers: UserParam("Company Set",
```

-continued

```
                "Test");
            industry: ConstParm("Tech", "Finance", "Transport");}
}
/#*
@type       "spade"
@title      "Overall Composite"
@tags       final    //no tags defined on output port
*#/
component StockBargainIndexComputation(output final) {
param string $monitoredTickers ;
            string $industry;
graph
        stream TradeQuote = TAQFileSource( )
            {param fileNameParm: UserParam ("TAQ Filename","");}
                | TAQRealTimeSource( )
            {param ipaddress:
                UserParam("TAQ IP Address","192.168.1.1:);}
    stream TradeOps = TradeOperations(TradeQuote)
            {param monitoredTickers: $monitoredTickers;
                   industry: $industry;}
    stream QuoteFilter? = FilterQuoteByTickers(TradeQuote)
            {param monitoredTickers: $monitoredTickers;}
                | FilterQuoteByIndustry(TradeQuote)
            {param industry: $industry;}
    stream BargainIndex = BIComp(TradeOps; QuoteFilter){ }
    stream final = VizSink(BargainIndex) { }
                | TCPSink(BargainIndex) { }
}
/#*
@type       "spade"
@title      "Compute VWAP"
@tags       Vwap VWAP
*#/
component TradeOperations(input TradeQuote; ouptut Vwap) {
param
        string $monitoredTickers;
        string $industry;
graph
        stream TradeFilter? = FilterTradeByTickers(TradeQuote)
                {param monitoredTickers: $monitoredTickers;}
                | FilterTradeByIndustry(TradeQuote)
                {param industry: $industry;}
    stream Vwap = VwapComputation(TradeFilter)
                {param window : 4;}
}
```

In summary, a flow pattern is described as a directed acyclic graph, G(V,E). Each vertex $v \in V$ can be one of the following:

1. The invocation of a primitive component;
2. The invocation of a composite component, which is again modeled as a flow pattern;
3. The optional invocation of a component; or
4. The invocation of one of an enumeration of components.

The component invoked may have sub-components. In addition, a component can be invoked with parameter values, which are either hard-coded, specifiable by end-users or associated with one or more tags.

Formally, a flow pattern is defined as a set of flows (where each flow contains no abstract components). Note that a flow is the same as a component, given the recursive definition of components. Given a finite alphabet, $\Sigma$, consisting of all components (primitive and abstract), a flow pattern is constructed recursively as follows:

1. The empty set is a flow pattern, represented by $\phi$
2. The empty flow is a flow pattern, represented by $\theta$. An empty flow is a flow with no components. Note that this is different from $\phi$, which is a set containing no flow.
3. A single non-abstract component (or flow) is a flow pattern represent by A={c}.
4. Optionals. Given a component c, c? is a flow pattern represented by the set {c, $\theta$}.
5. Inheritance. A component, X, with concrete descendants is a flow pattern, represented by the set of its concrete (i.e., non-abstract) descendant components. Note that X may be abstract.
6. Choice. If $A_1$ and $A_2$ are flow patterns, $A_1|A_2$ is a flow pattern, defined by the set $A_1 \cup A_2$.
7. Concatenation. Let $A_1$, $A_2$ be flow patterns over $\Sigma$, such that the components (or flows) in $A_1$ have a common set of output ports, and the components (or flows) in $A_2$ have a common set of input ports. Let (i) $O_1=\{o_1^i\}$ the set of output ports that appear in flows represented by $A_1$, and $O_1 \neq \emptyset$, (ii) $I_2=\{i_2^j\}$ be the set of input ports for flows represented by $A_2$. Note that in order for $A_2$ to be stitched to anything, its input ports are to be connected to some data link. Therefore, flows that result from the pattern $A_2$ have the same set of input ports.

Then, the concatenation $A_1 \cdot^\mu A_2$ (where $\mu: I_2 \to O_1$ is a function denoting connections between all input ports of any flow in $A_1$) is a flow pattern.

The use of a choice of components and of a component with concrete descents are equivalent, i.e., the same set of flows can be described either by using a component with descendants or by listing all the descendants in the flow pattern. The only difference is that describing a component with descendants adds a layer of indirection; hence, it is possible to add a new descendant to the component and have new flows be available without changing the flow pattern definition in the composite.

As described above, subsequent to generalizing a single flow into a flow pattern, the pattern definition is compiled by a pattern compiler (see, e.g., STEP 408, FIG. 4). This compilation is described in further detail below.

Compilation

The pattern language (i.e., the flow pattern with tagged components) is compiled to allow users to explore the space of possible flows and parameterizations of the flows described in the pattern. The compilation of flow patterns results in the generation of a number of MARIO component descriptions. A MARIO component description has tag-based input and output constraints. Some of the tags in a MARIO component description are those specified by the developer in annotating components. Other tags in a MARIO component description are generated by the Cascade compiler and are used to encode composition constraints between different components, so as to ensure that the components are only composed into flows as specified in the pattern.

The flow pattern definition describes composition constraints between different types of components. These composition constraints are encoded in the tag-based descriptions of the MARIO components generated after compilation. Each appearance of a component in a pattern results in the generation of a separate MARIO component description with its own set of input and output tag-based constraints. Each link in the flow pattern is also associated with a unique tag. The output port of the components that can produce this link is annotated by this unique tag, and the input ports that this link can be connected to also has the same unique tag. This ensures that the planner will compose only those flows that are part of the flow pattern and no other flows.

Tags used in the description of output ports in the pattern become a special kind of tag called "sticky tags" in MARIO. By default, tags in MARIO do not get propagated from the input link to the output link, unless they are specially declared as sticky tags.

One example of a technique for generating MARIO component descriptions from a pattern, described as a directed acyclic graph, G(V,E), is described below:

1. For each x ∈ V.
   Assume x has m input ports and n output ports. Let the m input ports be connected to incoming edges of the form $e(u^j_o, x^k_i)$ and the n output ports be connected to outgoing edges of the form $e(x^l_o, w^m_i)$.
2. For each enumerated component, v, that x contains, do
2.1 If v is a primitive component
   Generate a MARIO component description with m input ports and n output ports. Each input port constraint contains one tag, named as the data link $e(u^j_o, v^k_i)$. Each output port constraint contains one tag, named as the data link, $e(v^k_o, w^m_i)$. The output port constraint also has any sticky tags as defined in the description of v.
2.2 Else if v is a composite component, described as G'(V', E')
2.2.1 Generate one MARIO component description for the entry component and one for the exit component. The entry component has m input and output ports, and the exit component has n input and output ports. The m input ports of the entry component are annotated by the incoming data links, $e(u^j_o, v^k_i)$. The n output ports of the exit component are annotated by the outgoing data links, $e(v^l_o, w^m_i)$. The output port annotations also have any sticky tags as defined in the description of v.
2.2.2 Call Pattern_Compilation (G'(V',E'))—(This is a recursive call of the compilation logic.)
2.3 If v is an optional component
   Generate a "dummy" primitive component that performs no operation with m input ports and n output ports. Each input port constraint contains one tag, named as the data link $e(u^j_o, v^k_i)$. Each output port constraint contains one tag, named as the data link $e(v^l_o, w^m_i)$.
3. For each component description, c, generated in Step 2, Generate a new component description for each descendant of d adding tags according to the reasoning process described above.
4. Remove any component descriptions corresponding to abstract components from the planner's consideration.

The component descriptions produced by the compiler are input to, for instance, a MARIO planner (see, e.g., STEP 412, FIG. 4) to generate a web interface (see, e.g., STEP 414, FIG. 4) where end users can submit goals (see, e.g., STEP 416, FIG. 4), which are automatically planned into flows (see, e.g., STEP 418, FIG. 4). For instance, to generate the web interface, the planner looks at the component descriptions, produces all possible plans and provides them in the interface.

The MARIO planner has a matching algorithm for determining if the data link produced from the output port of one component can be fed into the input port of another component. As an example, the input port description and the data link description each includes a set of tags. A data link is then matched to the input port by matching the tags of the data link with the tags of the input port. Formally, an input constraint of a component, c, denoted by $I_c$ is a set of tags, i.e., $I_c \subseteq (T)$. A data link, a, with a description of d(a) matches an input constraint, $I_o$ (denoted by $d(a) \sqsubseteq I_o$, iff for each tag in $I_o$, there exists a sub-tag that appears in d(a), i.e., $\forall y \in (I_o \cap T), (\exists x \in d(a), x < y)$. One example of the MARIO matching process is described in Eric Bouillet, Mark Feblowitz, Zhen Liu, Anand Ranganathan, and Anton Riabov, "A tag-based approach for the design and composition of information processing applications," in OOPSLA, pages 585-602, 2008. Further, a planning example is described in U.S. Patent Application Publication No. US 2009/0177955 A1, entitled "Method and System for Modeling User Requests, Applications and Components Used in Dynamic Application Assembly," Liu et al., published Jul. 9, 2009.

The MARIO Planner uses these input-output composition constraints to compose flows given an end-user goal as a set of tags and the description of components. At a high level, the planner works by checking if a set of links available in the current state can be used to construct an input to a component, and if so, it generates a new data link corresponding to the output. It performs this process recursively and keeps generating new links until it produces one that matches the goal pattern, or until no new unique links can be produced.

End-User Interface for Domain Experts

It is possible for domain experts to rapidly come up with desired flows by submitting high-level goals (see., e.g., STEP 416, FIG. 4). A user interface is described that allows end-users (who may be domain experts) to submit a goal, consisting of a set of tags, to the planner, which then composes a flow satisfying the goal. This is described herein, and one or more aspects are also described in U.S. Patent Application Publication No. US 2009/0100407 A1 entitled "Method and System for Simplified Assembly of Information Processing Applications," Bouillet et al., published Apr. 16, 2009.

In order to simplify the construction of the goal for the user, a faceted navigation interface is used, in one example. The set of tags that are available for inclusion within the goal are displayed in a tag cloud that is partitioned into a number of facets. Facets may correspond to the patterns available, different aspects of the pattern, various possible parameterizations of components in the pattern, etc.

Figure 12:
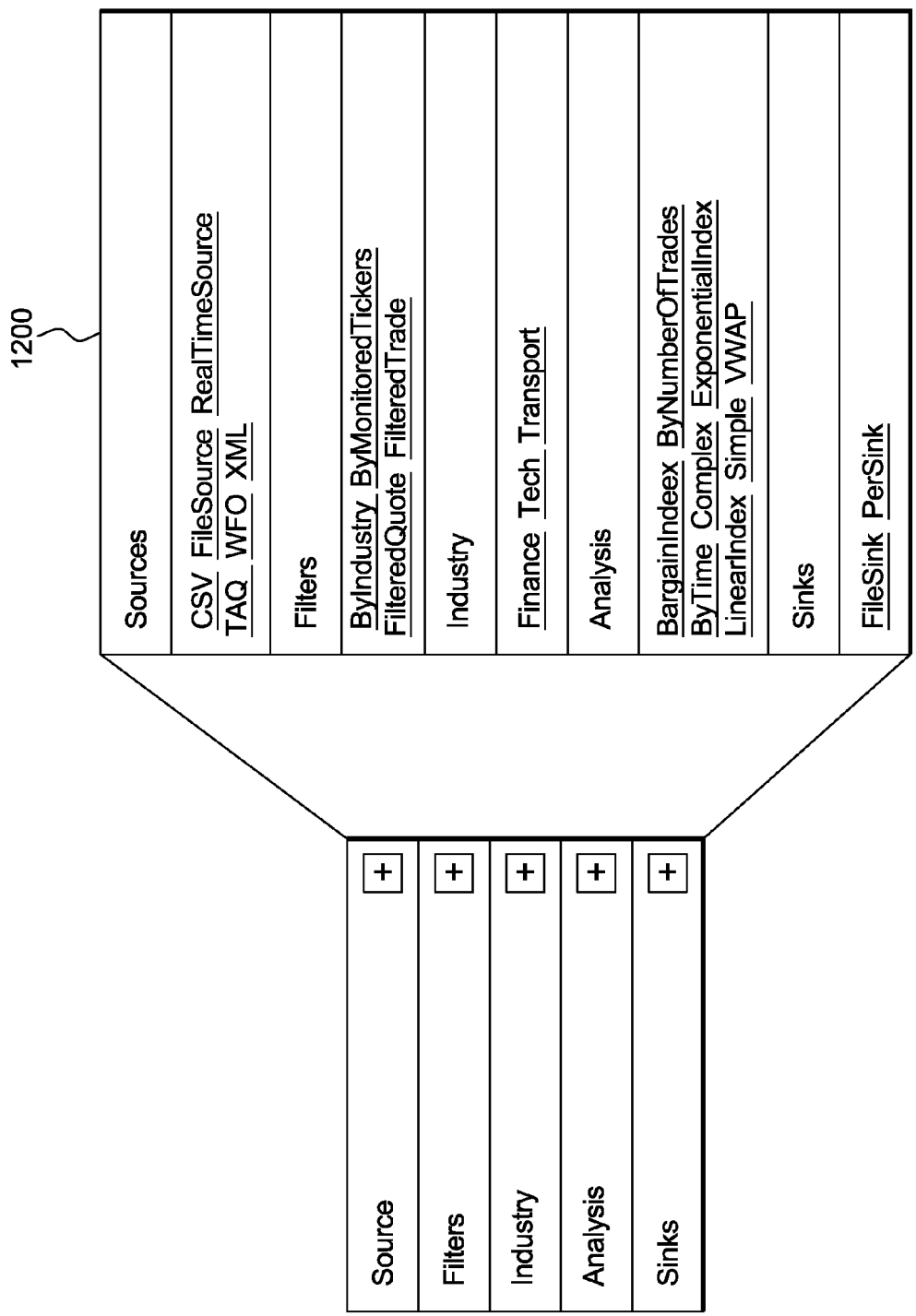
FIG. 12 depicts one example of a faceted tag cloud, in accordance with an aspect of the present invention.

An example of such a faceted tag cloud 1200 is shown in FIG. 12. These tags appear in the faceted tag cloud because they are part of goals that can be satisfied by at least one composable flow built from a library of available components. That is, some flow is capable of satisfying the goal FileSource, another is capable of satisfying ByIndustry, etc. Note that some tags are larger, indicating that they are relevant to a larger number of user-specified goals, i.e., they appear in a larger number of composable flows.

Figure 13:
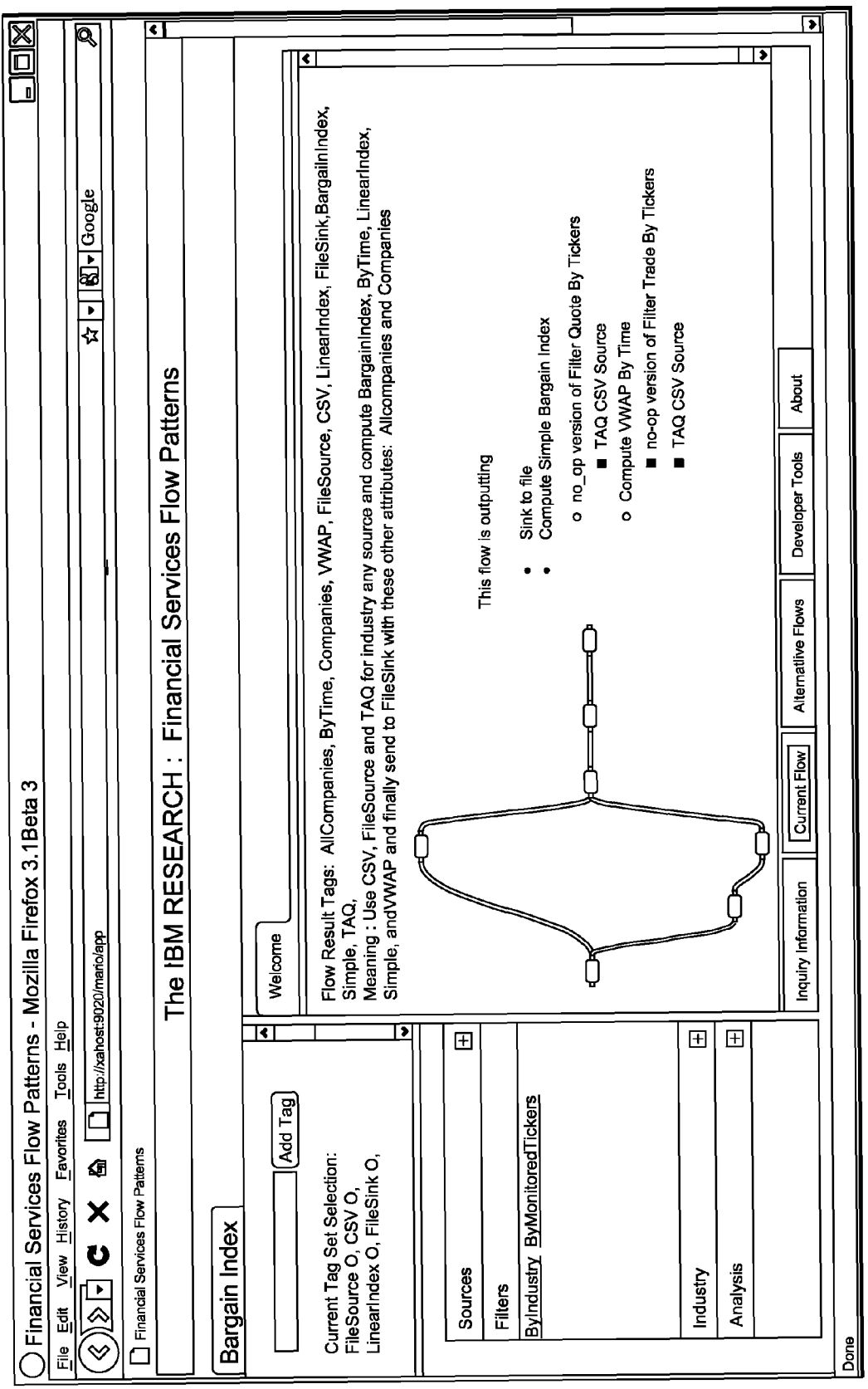
FIG. 13 depicts one example of a user interface for a current goal, in accordance with an aspect of the present invention.

For example, one possible goal refinement path is to first select a high-level source tag from the Sources facet (such as FileSource), followed by a more specific file source type (such as CSV). Next, the user can pick other tags corresponding to different flow functionalities, like LinearIndex (for the bargain index calculation), and FileSink, for sending the results to a file. FIG. 13 shows the user interface when the current goal is FileSource, CSV, LinearIndex, FileSink. In this case, the flow depicted was selected by the planner as the best assembly of known components to satisfy the goal. The notion of best is based on minimizing a cost metric (or other metric), where each component is associated with a cost. By default, all the components have the same cost; this results in the shortest message flows being shown to the user. The tag hierarchy also plays a role in the goal refinement process by allowing users to start by selecting high-level tags, and subsequently refining the goal by selecting lower-level tags.

The flow that is shown does not filter the trade and quote source data. Hence, the description of the flow at the bottom right includes a couple of no-op components, which were inserted by the planner in lieu of the actual filter components. Remember that the filter components were specified as optional in the flow pattern. Thus, the user can refine the current goal further by selecting a tag from the Filters facet like ByIndustry or ByMonitoredTickers. This will cause the no-op components to be replaced by actual filters.

The tag cloud is built by the planner by generating all (or a subset of) possible flows for the current goal, and then aggregating the tags corresponding to the data links produced by these flows. The planner can perform this complete generation of satisfying flows very efficiently.

As the user selects the tags in any order, the selected tags are added to the goal. The selection of these tags successively refines the goal. Each time the user selects a tag, the planner generates all (or a subset of) possible flows that can satisfy the current goal. In addition, it computes a new tag cloud that includes those tags that can be added to the current goal and still be satisfiable. For example, asking merely for FileSource could result in the assembly of a large number of flows (that process data in different formats, route data to different sets of servers, log different artifacts, etc.). The user can then select a new tag from the subsequent tag cloud to refine the goal. This iterative goal refinement makes it easy for end-users to arrive at the desired flow(s) quickly. In addition, the process, in one embodiment, only allows user to select goals for which flows exist; therefore, they cannot submit goals with incompatible tags. Another advantage of the faceted tag cloud based interface is that it exposes a variety of flow building and parameterization options of which the user may not have been aware. Thus, it places more power in the hands of the user.

The value of the parameter may be obtained from end-users in two ways—they can either directly specify the value of the parameter using an appropriate UI widget like a textbox, or they can select a tag (or a set of tags) in their goal which may be associated with a pre-specified parameter value. For example, in the current example, selecting the tag Finance results in a FilterByIndustry component placed in the flow, with the industry parameter value set of "Finance". Selecting the ByMonitoredTickers tag, results in a FilterByTickers component placed in the flow, and also a textbox in the webpage, where the user can enter a set of tickers to monitor.

Once the user is satisfied with a flow composed by MARIO and has supplied any necessary or desired parameters, the flow can be deployed on a backend platform. Before this happens, in one example, the composed flow is translated into a script in the platform-specific language. For example, this script may be SPADE, if the platform is System S. For each possible supported platform, MARIO has a platform-specific plugin which converts a flow into the platform-specific language. This plugin can make use of the code snippets that are embedded in the primitive component definitions. The plugin may also generate unique names for the components and the data links in the flow, and also replace the input and output port names with the newly generated names.

Described in detail above is a capability for creating a flow pattern from a single flow, in which the flow pattern describes a plurality of flows that are structurally similar and perform similar tasks. For instance, the plurality of flows include the original flow obtained by the processor, as well as other flows that can be created by performing certain transformations on the original flow (i.e., derived from the original flow). These transformations include one or more of the following, as examples: substituting components in the original flow by other components or flows; changing the values of parameters in the components; removing components from the flow; or adding components to the flow. End users are then capable of exploring the different flows of the pattern and selecting one or more flows based on high-level goals.

In one example, a planner is used to automatically generate plans for user-specified goals. One example of planning performance time and number of plans generated for different goals in the bargain index calculation examples is depicted in the table below:

| Planning times for sample composition requests | | | |
|---|---|---|---|
| Composition Request | Plan Time (sec) | # of components in flow | Total # of flows |
| Null | 16.29 | — | 46445 |
| FileSource | 26.43 | 1 | 21627 |
| FileSource, ByIndustry | 18.73 | 2 | 18232 |
| FileSource, ByIndustry, VWAP | 17.91 | 3 | 12141 |
| FileSource, ByIndustry, VWAP, ExponentialIndex | 12.14 | 5 | 8331 |
| FileSource, ByIndustry, VWAP, ExponentialIndex, FileSink | 1.7 | 6 | 2097 |
| BargainIndex | 26.80 | 3 | 18300 |
| BargainIndex, Finance | 28.06 | 5 | 13830 |
| BargainIndex, Finance, RealtimeSource | 23.06 | 5 | 6506 |

In this example, the complete Bargain Index prototype had 67 components defined (primitive and composite). The primitive components embedded scripts in SPADE. The Table presents some example goals and planning times of the planner for the prototype domain. The experiments were performed with the planner running on, for instance, an Intel Xeon 4-core machine, with a 3 GHz processor and 8 GB RAM. In this example, the planner is a complete planner, i.e., it generates all possible plans that satisfy the goals. Therefore, the times shown are for generating all possible plans (as opposed to just the first plan). Note that, in general, as the goal contains more and more tags, the planning time decreases. The reason for this is that the planner is complete; i.e., it produces all possible plans, and then ranks them. Hence, the more constrained the composition request, the lesser the number of possible plans, and the faster the planning Note that a goal of Null causes the planner to construct all possible flows (i.e., the planner is given no constraints for composition). In another embodiment, not all plans are produced.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electro-magnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 14:
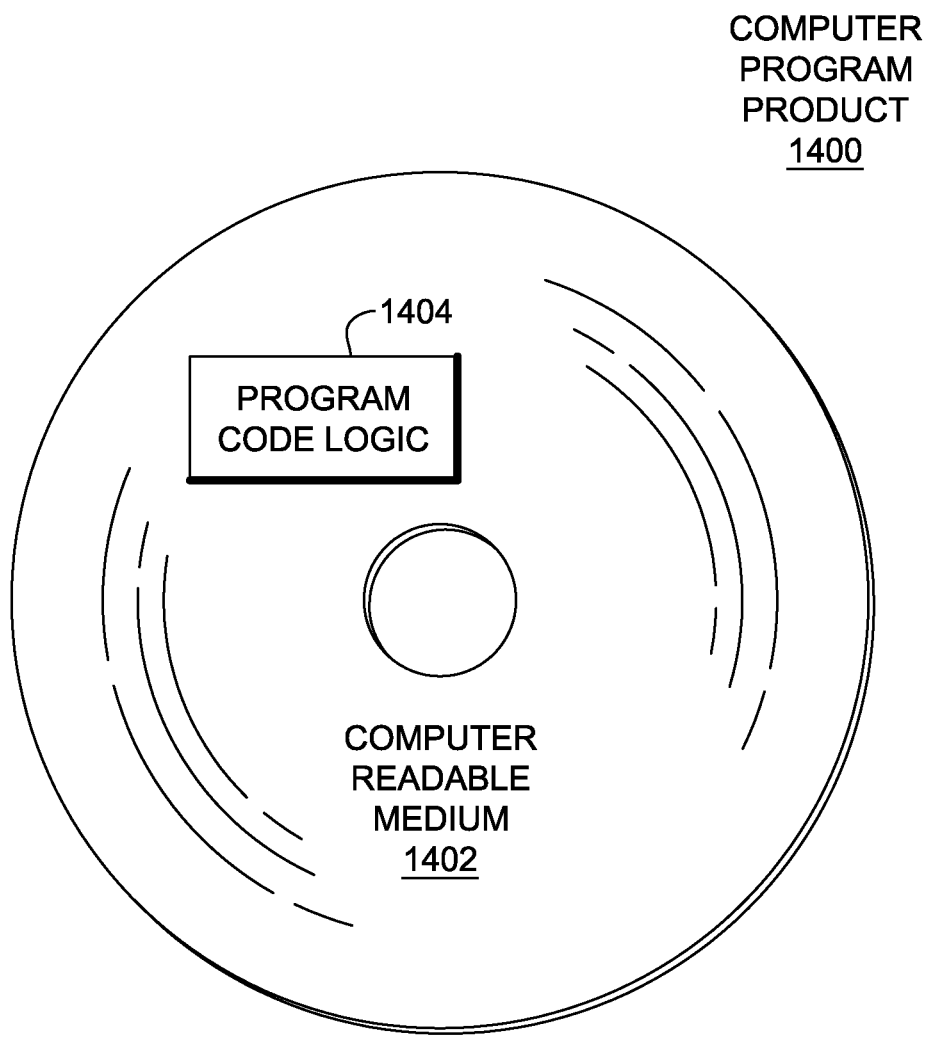
FIG. 14 depicts one embodiment of a computer program product incorporating one or more aspects of the present invention.

Referring now to FIG. 14, in one example, a computer program product 1400 includes, for instance, one or more computer readable media 1402 to store computer readable program code means or logic 1404 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, other platforms and/or languages can be used without departing from the spirit of the present invention. Further, flows can represent other industries and/or include other information. Industries other than the financial industry can benefit from one or more aspects of the present invention. The financial industry is provided as only one example. Many other variations are also possible.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method of providing data processing flows, said method comprising:
   obtaining, by a processor, an information processing flow;
   generalizing, using the processor, the information processing flow to provide, based on the information processing flow, a pattern to be used to define a plurality of flows to be used to create one or more platform specific flows to be executed, the generalizing comprising:
      identifying one or more different points of variability from the information processing flow, at least one point of variability of the one or more different points of variability being variability of a component of the information processing flow; and
      encapsulating one or more fragments of the information processing flow into one or more components of the pattern, the one or more components of the pattern usable in defining the plurality of flows from the pattern, wherein the pattern created from generalizing the information processing flow identifies the one or more different points of variability, wherein a component of the one or more components of the pattern incorporates the component of the information processing flow and the at least one point of variability of the component of the information processing flow, the incorporated at least one point of variability of the component of the information processing flow being selectable to create at least one platform specific flow of the one or more platform specific flows, and wherein the one or more different points of variability provide one or more derivations of the information processing flow to be used to define the plurality of flows;
   obtaining one or more user goals; and
   using the one or more user goals to select a flow of the plurality of flows.

2. The method of claim 1, wherein the one or more components include one or more primitive components, and the generalizing comprises defining one or more higher-level components recursively as flows of one or more primitive components.

3. The method of claim 2, wherein the generalizing further comprises:
   associating at least one of one or more primitive components or one or more higher-level components with metadata.

4. The method of claim 3, wherein the generalizing further comprises:
   defining an inheritance relationship between at least two components, wherein the at least two components comprises primitive components or higher-level components.

5. The method of claim 3, wherein the generalizing further comprises describing one or more parameters for at least one or more primitive components or one or more higher-level components.

6. The method of claim 1, wherein the generalizing provides at least one of one or more variations in a structure of the information processing flow, one or more variations in one or more components of the information processing flow, or one or more possible parameterizations of the one or more components of the information processing flow, and wherein the pattern incorporates the at least one of the one or more variations in structure, one or more variations in one or more components, or one or more possible parameterizations of the one or more components.

7. The method of claim 6, wherein the one or more variations in the structure include at least one of replacing a component of the information processing flow by a descendant of the component, specifying by a component of the information processing flow an enumeration of possible components, or designating a component of the information processing flow as optional.

8. The method of claim 1, further comprising compiling a definition of the pattern to provide one or more component descriptions used to compose one or more flows of the pattern selectable by a user.

9. The method of claim 8, further comprising providing one or more tags for the one or more component descriptions.

10. The method of claim 1, wherein the one or more user goals are in the form of one or more tags.

11. The method of claim 1, wherein the at least one point of variability of the component of the information processing flow includes one or more of: possible data sources to be accessed, possible operations to be performed, possible sinks or visualizations of result data, or possible parameters.

12. A computer system for providing data processing flows, the computer system comprising:
    a memory; and
    a processor in communications with the memory, wherein the computer system is capable of performing a method, said method comprising:
        obtaining an information processing flow;
        generalizing the information processing flow to provide, based on the information processing flow, a pattern to be used to define a plurality of flows to be used to create one or more platform specific flows to be executed, the generalizing comprising identifying one or more different points of variability from the information processing flow, at least one point of variability of the one or more different points of variability being variability of a component of the information processing flow, and encapsulating one or more fragments of the information processing flow into one or more components usable in defining the plurality of flows from the pattern, wherein the pattern created from generalizing the information processing flow identifies the one or more different points of variability, wherein a component of the one or more components of the pattern incorporates the component of the information processing flow and the at least one point of variability of the component of the information processing flow, the incorporated at least one point of variability of the component of the information processing flow being selectable to create at least one platform specific flow of the one or more platform specific flows, and wherein the one or more different points of variability provide one or more derivations of the information processing flow to be used to define the plurality of flows;
        obtaining one or more user goals; and
        using the one or more user goals to select a flow of the plurality of flows.

13. The computer system of claim 12, wherein the one or more components include one or more primitive components, and the generalizing comprises defining one or more higher-level components recursively as flows of one or more primitive components.

14. The computer system of claim 12, wherein the generalizing provides at least one of one or more variations in a structure of the information processing flow, one or more variations in one or more components of the information processing flow, or one or more possible parameterizations of the one or more components of the information processing flow, and wherein the pattern incorporates the at least one of the one or more variations in structure, one or more variations in one or more components, or one or more possible parameterizations of the one or more components.

15. The computer system of claim 12, wherein the method further comprises compiling a definition of the pattern to provide one or more component descriptions used to compose one or more flows of the pattern selectable by a user.

16. The computer system of claim 12, wherein the one or more user goals are in the form of one or more tags.

17. A computer program product for providing data processing flows, the computer program product comprising:
    a non-transitory computer readable storage medium readable by a processing circuit and storing instructions for execution by the processing circuit for performing a method comprising:
        obtaining an information processing flow;
        generalizing the information processing flow to provide, based on the information processing flow, a pattern to be used to define a plurality of flows to be used to create one or more platform specific flows to be executed, the generalizing comprising identifying one or more different points of variability from the information processing flow, at least one point of variability of the one or more different points of variability being variability of a component of the information processing flow, and encapsulating one or more fragments of the information processing flow into one or more components usable in defining the plurality of flows from the pattern, wherein the pattern created from generalizing the information processing flow identifies the one or more different points of variability, wherein a component of the one or more components of the pattern incorporates the component of the information processing flow and the at least one point of variability of the component of the information processing flow, the incorporated at least one point of variability of the component of the information processing flow being selectable to create at least one platform specific flow of the one or more platform specific flows, and wherein the one or more different points of variability provide one or more derivations of the information processing flow to be used to define the plurality of flows;
        obtaining one or more user goals; and
        using the one or more user goals to select a flow of the plurality of flows.

18. The computer program product of claim 17, wherein the one or more components include one or more primitive components, and the generalizing comprises defining one or more higher-level components recursively as flows of one or more primitive components.

19. The computer program product of claim 18, wherein the generalizing further comprises:
    associating at least one of one or more primitive components or one or more higher-level components with metadata.

20. The computer program product of claim 19, wherein the generalizing further comprises:
    defining an inheritance relationship between at least two components, wherein the at least two components comprises primitive components or higher-level components.

21. The computer program product of claim 17, wherein the generalizing provides at least one of one or more variations in a structure of the information processing flow, one or more variations in one or more components of the information processing flow, or one or more possible parameterizations of the one or more components of the information processing flow, and wherein the pattern incorporates the at least one of the one or more variations in structure, one or more variations in one or more components, or one or more possible parameterizations of the one or more components.

22. The computer program product of claim 17, wherein the method further comprises compiling a definition of the pattern to provide one or more component descriptions used to compose one or more flows of the pattern selectable by a user.

23. The computer program product of claim 17, wherein the one or more user goals are in the form of one or more tags.

24. A method of deploying logic on one or more processors to provide data processing flows, said method comprising:
   installing logic on at least one processor, the logic to:
      obtain an information processing flow;
      generalize the information processing flow to provide, based on the information processing flow, a pattern to be used to define a plurality of flows to be used to create one or more platform specific flows to be executed, the generalizing comprising identifying one or more different points of variability from the information processing flow, at least one point of variability of the one or more different points of variability being variability of a component of the information processing flow, and encapsulating one or more fragments of the information processing flow into one or more components of the pattern, the one or more components of the pattern usable in defining the plurality of flows from the pattern, wherein the pattern created from generalizing the information processing flow identifies the one or more different points of variability, wherein a component of the one or more components of the pattern incorporates the component of the information processing flow and the at least one point of variability of the component of the information processing flow, the incorporated at least one point of variability of the component of the information processing flow being selectable to create at least one platform specific flow of the one or more platform specific flows, and wherein the one or more different points of variability provide one or more derivations of the information processing flow to be used to define the plurality of flows;
      obtain one or more user goals; and
      use the one or more user goals to select a flow of the plurality of flows.

25. The method of claim 24, wherein the one or more user goals are in the form of one or more tags.

* * * * *